US011057837B2

(12) United States Patent
Fakoorian et al.

(10) Patent No.: US 11,057,837 B2
(45) Date of Patent: Jul. 6, 2021

(54) DOWNLINK POWER ADJUSTMENT IN NARROWBAND WIRELESS COMMUNICATIONS

(71) Applicant: QUALCOMM Incorporated, San Diego, CA (US)

(72) Inventors: Seyed Ali Akbar Fakoorian, San Diego, CA (US); Alberto Rico Alvarino, San Diego, CA (US); Wanshi Chen, San Diego, CA (US); Peter Gaal, San Diego, CA (US); Hao Xu, San Diego, CA (US); Xiao Feng Wang, San Diego, CA (US); Renqiu Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 15/447,914

(22) Filed: Mar. 2, 2017

(65) Prior Publication Data

US 2017/0273026 A1    Sep. 21, 2017

Related U.S. Application Data

(60) Provisional application No. 62/308,581, filed on Mar. 15, 2016.

(51) Int. Cl.
*H04B 1/713* (2011.01)
*H04L 5/00* (2006.01)
(Continued)

(52) U.S. Cl.
CPC ......... *H04W 52/143* (2013.01); *H04L 5/0007* (2013.01); *H04L 5/0048* (2013.01);
(Continued)

(58) Field of Classification Search
CPC . H04W 52/143; H04W 72/04; H04W 52/247; H04B 17/24; H04B 7/0619
(Continued)

(56) References Cited

U.S. PATENT DOCUMENTS 9,113,419 B2      8/2015  Zhang et al.
2001/0050926 A1*  12/2001 Kumar ...................... H04L 1/08
                                                 370/529
(Continued)

FOREIGN PATENT DOCUMENTS

CN         104025673 A      9/2014
JP         2013542676 A     11/2013
(Continued)

OTHER PUBLICATIONS

NEC Group, "*Signaling Support for Non-Zero Transmission Power ABS*"3GPP TSG RAN WG1 Meeting #68 dated Feb. 6-10, 2012, R1-120888.
(Continued)

*Primary Examiner* — Asad M Nawaz
*Assistant Examiner* — Jason A Harley
(74) *Attorney, Agent, or Firm* — Holland & Hart LLP; Nerrie M. Zohn

(57) ABSTRACT

A device, such as a base station or user equipment (UE), may identify a narrowband reference signal (NB-RS) energy per resource element (EPRE) for a NB-RS to be transmitted in a wireless transmission. The device may identify a ratio of a narrowband physical downlink shared channel (N-PDSCH) EPRE to the NB-RS EPRE for orthogonal frequency division multiplexing (OFDM) symbols containing neither a cell-specific reference signal (CRS) nor a NB-RS. In deployments where NB transmissions are transmitted in a guard-band adjacent to a wideband system bandwidth, a device may identify a second ratio for
(Continued)

N-PDSCH EPRE to CRS EPRE within OFDM symbols containing CRS. In deployments where NB transmissions are transmitted in-band with the wideband system bandwidth, a device may identify a third ratio of NB-RS EPRE to CRS EPRE, and a fourth ratio of N-PDSCH EPRE to NB-RS EPRE within OFDM symbols containing NB-RS transmissions.

62 Claims, 15 Drawing Sheets

(51) Int. Cl.
| | |
|---|---|
| H04W 52/02 | (2009.01) |
| H04W 16/02 | (2009.01) |
| H04W 52/14 | (2009.01) |
| H04L 27/26 | (2006.01) |
| H04L 25/02 | (2006.01) |
| H04W 4/70 | (2018.01) |
| H04W 52/42 | (2009.01) |
| H04W 4/90 | (2018.01) |
| H04W 4/06 | (2009.01) |

(52) U.S. Cl.
CPC ........ *H04L 5/0051* (2013.01); *H04L 25/0228* (2013.01); *H04L 27/2649* (2013.01); *H04W 4/70* (2018.02); *H04W 52/42* (2013.01); *H04W 4/06* (2013.01); *H04W 4/90* (2018.02)

(58) Field of Classification Search
USPC .......................................................... 370/329
See application file for complete search history.

(56) References Cited

U.S. PATENT DOCUMENTS

| | | | | |
|---|---|---|---|---|
| 2009/0285191 | A1* | 11/2009 | Fang | H04L 1/1825 370/338 |
| 2010/0177857 | A1* | 7/2010 | Huttunen | H04L 27/2614 375/350 |
| 2012/0275415 | A1* | 11/2012 | Wang | H04W 52/58 370/329 |
| 2013/0176952 | A1* | 7/2013 | Shin | H04L 5/001 370/329 |
| 2013/0315191 | A1* | 11/2013 | Yoshimoto | H04J 11/0056 370/329 |
| 2013/0329662 | A1* | 12/2013 | Chen | H04W 72/0473 370/329 |
| 2014/0139286 | A1* | 5/2014 | Laporte | H04L 27/368 330/149 |
| 2015/0009914 | A1* | 1/2015 | Chen | H04L 5/0073 370/329 |
| 2015/0016374 | A1 | 1/2015 | Liang et al. | |
| 2015/0016376 | A1* | 1/2015 | Seo | H04W 72/0406 370/329 |
| 2015/0043406 | A1* | 2/2015 | Ko | H04W 52/38 370/311 |
| 2015/0092691 | A1* | 4/2015 | Hwang | H04L 5/0048 370/329 |
| 2015/0117505 | A1* | 4/2015 | Vazhenin | H03M 13/33 375/227 |
| 2015/0264670 | A1* | 9/2015 | Lee | H04L 5/0007 370/312 |
| 2015/0341091 | A1* | 11/2015 | Park | H04B 7/0617 375/267 |
| 2016/0156430 | A1 | 6/2016 | Madan et al. | |
| 2017/0265156 | A1* | 9/2017 | Xue | H04W 56/001 |
| 2017/0373900 | A1* | 12/2017 | Adhikary | H04W 56/0015 |

FOREIGN PATENT DOCUMENTS

| | | |
|---|---|---|
| RU | 2012126894 A | 1/2014 |
| WO | WO-2015036751 A2 | 3/2015 |

OTHER PUBLICATIONS

3GPP, "3rd Generation Partnership Project; Technical Specification Group Radio Access Network; Evolved Universal Terrestrial Radio Access (E-UTRA); Radio Resource Control (RRC): Protocol Specification (Release 13)", 3GPP Technical Specification, Dec. 2015 (server date: Jan. 6, 2016), 507 pgs., 3GPP TS 36.331, V13.0.0, XP051047501, 3rd Generation Partnership Project, Sophia-Antipolis Valbonne, France.

Huawei et al., "Updated Work Plan for Narrowband IoT (NB-IoT)," 3GPP TSG-RAN Meeting #71, RP-160289, Gothenburg, Sweden, Mar. 7-10, 2016, 5 pgs., XP051076242, 3rd Generation Partnership Project.

ISA/EP, International Search Report and Written Opinion of the International Searching Authority, Int'l Application No. PCT/US2017/020776, dated Jun. 6, 2017, European Patent Office, Rijswijk, NL, 18 pgs.

Spreadtrum Communications, "Further Discussion on the Reference Signal Design for NB-IoT," 3GPP TSG RAN WG1 Meeting #84, R1-160820, Malta, Feb. 15-19, 2016, 5 pgs., XP051054146, 3rd Generation Partnership Project.

* cited by examiner

DOWNLINK POWER ADJUSTMENT IN NARROWBAND WIRELESS COMMUNICATIONS

CROSS REFERENCES

The present application for patent claims priority to U.S. Provisional Patent Application No. 62/308,581 by Fakoorian, et al., entitled "Downlink Power Adjustment in Narrowband Wireless Communications," filed Mar. 15, 2016, and assigned to the assignee hereof, which is expressly incorporated by reference herein for any and all purposes.

BACKGROUND

The following relates generally to wireless communication, and more specifically to downlink power adjustment in narrowband wireless communications.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include code division multiple access (CDMA) systems, time division multiple access (TDMA) systems, frequency division multiple access (FDMA) systems, orthogonal frequency division multiple access (OFDMA) systems, (e.g., a Long Term Evolution (LTE) system). A wireless multiple-access communications system may include a number of base stations, each simultaneously supporting communication for multiple communication devices, which may be otherwise known as user equipment (UE). Some communication devices operating on wireless multiple-access communications systems may have limitations on operational frequency bandwidth. These devices may be known as narrow band (NB) devices. In some cases, a wireless communications system may use a combination of the above multiple-access systems to support multiple types of UEs.

NB devices, such as NB Internet of Things (NB-IOT) devices, may have a limited frequency dimension (e.g., a single resource block (RB)) that is shared by multiple users, and may have wireless resources allocated in different portions of a wideband system bandwidth or outside of a wideband system bandwidth. In some deployments, wireless resources allocated for NB communications may occupy a portion of a wideband system bandwidth, which may be referred to as in-band deployments. In other deployments, wireless resources allocated for NB communications may occupy a guard-band located adjacent to the wideband system bandwidth. In still other deployments, wireless resources allocated for NB communications may be located in a stand-alone radio frequency spectrum band that is separate from the wideband system bandwidth.

A transmitter may benefit from capability to manage transmit powers for NB devices and, depending upon the in-band, guard-band, or stand-alone deployment of a device, management of transmit powers account for differing parameters (e.g., reference signals that may be present in different portions of in-band, guard-band, or stand-alone transmissions). System operation may be enhanced in some cases through efficient power management for NB transmissions and signaling of different power management parameters to one or more NB devices.

SUMMARY

Systems, methods, and apparatuses for downlink power management of narrowband (NB) devices are described. In some aspects a device, such as a base station or user equipment (UE), may identify a narrowband reference signal (NB-RS) energy per resource element (EPRE) for a NB-RS to be transmitted in a wireless transmission. The device may identify a ratio of a narrowband physical downlink shared channel (N-PDSCH) EPRE to the NB-RS EPRE for orthogonal frequency division multiplexing (OFDM) symbols containing neither a cell-specific reference signal (CRS) nor a NB-RS. In deployments where NB transmissions are transmitted in a guard-band adjacent to a wideband system bandwidth, a device may identify a second ratio for N-PDSCH EPRE to CRS EPRE within OFDM symbols containing CRS. In deployments where NB transmissions are transmitted in-band with the wideband system bandwidth, a device may identify a third ratio of NB-RS EPRE to CRS EPRE, and a fourth ratio of N-PDSCH EPRE to NB-RS EPRE within OFDM symbols containing NB-RS transmissions.

A device may use the identified power ratios to determine EPRE for different portions of transmissions, and a receiver may demodulate received transmissions using the different EPRE values to enhance the likelihood of a successful demodulation of the transmission. In some examples, a receiver may use the relative EPRE values to enhance channel estimation based on one or more of the CRS or NB-RS. A receiver also may enhance log likelihood ratio (LLR) calculations across different OFDM symbols using the determined EPRE values. The enhanced channel estimation and LLR calculations may provide enhanced decoding of signals provided in the NB transmissions and thus help provide enhanced demodulation.

In some examples, the different power ratios may be signaled from a transmitter, such as a base station, to a receiver, such as a UE, through one or more parameters signaled in a system information block (SIB), radio resource control (RRC) signaling, or combinations thereof. In some examples, the first ratio may be a UE specific parameter signaled to a UE via RRC signaling, and the second ratio may be a cell-specific parameter signaled to multiple UEs via a SIB.

A method of wireless communication is described. The method may include identifying a number of antenna ports used for a narrowband downlink shared channel transmission, and identifying a first power ratio between a first EPRE and a NB-RS EPRE for the narrowband downlink shared channel transmission based at least in part on the number of antenna ports. The first EPRE may be for two or more OFDM symbols in which a CRS and a NB-RS are absent. The method may also include identifying, based at least in part on the first power ratio, the first EPRE, and demodulating at least a portion of the narrowband downlink shared channel transmission received in the two or more OFDM symbols based at least in part on the identifying of the first EPRE.

An apparatus for wireless communication is described. The apparatus may include means for identifying a number of antenna ports used for a narrowband downlink shared channel transmission and means for identifying first power ratio between a first EPRE and a NB-RS EPRE for the narrowband downlink shared channel transmission based at least in part on the number of antenna ports. The first EPRE may be for two or more OFDM symbols in which a CRS and a NB-RS are absent. The apparatus may also include means for identifying, based at least in part on the first power ratio, the first EPRE, and means for demodulating at least a portion of the narrowband downlink shared channel transmission received in the two or more OFDM symbols based at least in part on the identifying of the first EPRE.

A further apparatus is described. The apparatus may include a processor, memory in electronic communication with the processor, and instructions stored in the memory. The instructions may be operable to cause the processor to identify a number of antenna ports used for a narrowband downlink shared channel transmission, and identify a first power ratio between a first EPRE and a NB-RS EPRE for the narrowband downlink shared channel transmission based at least in part on the number of antenna ports. The first EPRE may be for two or more OFDM symbols in which a CRS and a NB-RS are absent. The instructions may also be operable to cause the processor to identify, based at least in part on the first power ratio, the first EPRE, and demodulate at least a portion of the narrowband downlink shared channel transmission received in the two or more OFDM symbols based at least in part on the identifying of the first EPRE.

A non-transitory computer readable medium for wireless communication is described. The non-transitory computer-readable medium may include instructions to cause a processor to identify a number of antenna ports used for a narrowband downlink shared channel transmission, and identify a first power ratio between a first EPRE and a NB-RS EPRE for the narrowband downlink shared channel transmission based at least in part on the number of antenna ports. The first EPRE may be for two or more OFDM symbols in which a CRS and a NB-RS are absent. The instructions may further cause the processor to identify, based at least in part on the first power ratio, the first EPRE, and demodulate at least a portion of the narrowband downlink shared channel transmission received in the two or more OFDM symbols based at least in part on the identifying of the first EPRE.

Some examples of the method, apparatus, or non-transitory computer-readable medium described above may further include processes, features, means, or instructions for identifying a first value of the first power ratio where the number of antenna ports is one and identifying a second value of the first power ratio where the number of antenna ports is two.

Some examples of the method, apparatus, or non-transitory computer-readable medium described above may further include processes, features, means, or instructions for identifying a second power ratio between a CRS EPRE and a second EPRE for a resource element containing the downlink shared channel transmission within an OFDM symbol containing the CRS. Some examples of the method, apparatus, or non-transitory computer-readable medium described above may further include processes, features, means, or instructions for identifying, based at least in part on the second power ratio, one from the group consisting of: the CRS EPRE and the second EPRE.

Some examples of the method, apparatus, or non-transitory computer-readable medium described above may further include processes, features, means, or instructions for identifying a third power ratio between the NB-RS EPRE and the CRS EPRE. Some examples of the method, apparatus, or non-transitory computer-readable medium described above may further include processes, features, means, or instructions for identifying, based at least in part on the third power ratio, one from the group consisting of: the CRS EPRE and the NB-RS EPRE.

In some examples of the method, apparatus, or non-transitory computer-readable medium described above, identifying the third power ratio comprises: receiving the third power ratio or determining the third power ratio based at least in part on a configured coverage enhancement level.

Some examples of the method, apparatus, or non-transitory computer-readable medium described above may further include processes, features, means, or instructions for determining a fourth power ratio between the NB-RS EPRE and a third EPRE for a resource element containing the downlink shared channel transmission within an OFDM symbol containing the NB-RS based at least in part on the first power ratio, the second power ratio, the third power ratio, or any combination thereof.

In some examples of the method, apparatus, or non-transitory computer-readable medium described above, demodulating at least the portion of the narrowband downlink shared channel transmission comprises: performing a channel estimation based at least in part on the CRS EPRE, the NB-RS EPRE, the first EPRE, the second EPRE, the third EPRE, or any combination thereof, and calculating a LLR associated with one or more received resource elements based at least in part on the CRS EPRE, the NB-RS EPRE, the first EPRE, the second EPRE, the third EPRE, or any combination thereof.

In some examples of the method, apparatus, or non-transitory computer-readable medium described above, identifying the second power ratio comprises: receiving a second power parameter in a SIB, and determining the second power ratio based at least in part on the second power parameter and the first power ratio.

In some examples of the method, apparatus, or non-transitory computer-readable medium described above, identifying the first power ratio comprises: receiving a first power parameter in RRC signaling, and determining the first power ratio based at least in part on the first power parameter.

Some examples of the method, apparatus, or non-transitory computer-readable medium described above may further include processes, features, means, or instructions for determining the first power ratio based at least in part on the first power parameter and the number of antenna ports.

A method of wireless communication is described. The method may include identifying a number of antenna ports to be used for a narrowband downlink shared channel transmission, identifying a first power ratio between a first downlink shared channel EPRE and a NB-RS EPRE for the narrowband shared channel transmission based at least in part on the number of antenna ports, identifying, based at least in part on the first power ratio, a first downlink shared channel EPRE for two or more OFDM symbols of the narrowband downlink shared channel transmission in which a CRS and a NB-RS are absent and transmitting the downlink shared channel transmission to one or more receivers according to the identified first downlink shared channel EPRE.

An apparatus for wireless communication is described. The apparatus may include means for identifying a number of antenna ports to be used for a narrowband downlink shared channel transmission, means for identifying a first power ratio between a first downlink shared channel EPRE and a NB-RS EPRE for the narrowband shared channel transmission based at least in part on the number of antenna ports, means for identifying, based at least in part on the first power ratio, a first downlink shared channel EPRE for two or more OFDM symbols of the narrowband downlink shared channel transmission in which a CRS and a NB-RS are absent and means for transmitting the downlink shared channel transmission to one or more receivers according to the identified first downlink shared channel EPRE.

A further apparatus is described. The apparatus may include a processor, memory in electronic communication with the processor, and instructions stored in the memory. The instructions may be operable to cause the processor to identify a number of antenna ports to be used for a narrowband downlink shared channel transmission, identify a first power ratio between a first downlink shared channel EPRE and a NB-RS EPRE for the narrowband shared channel transmission based at least in part on the number of antenna ports, identify, based at least in part on the first power ratio, a first downlink shared channel EPRE for two or more OFDM symbols of the narrowband downlink shared channel transmission in which a CRS and a NB-RS are absent and transmit the downlink shared channel transmission to one or more receivers according to the identified first downlink shared channel EPRE.

A non-transitory computer readable medium for wireless communication is described. The non-transitory computer-readable medium may include instructions to cause a processor to identify a number of antenna ports to be used for a narrowband downlink shared channel transmission, identify a first power ratio between a first downlink shared channel EPRE and a NB-RS EPRE for the narrowband shared channel transmission based at least in part on the number of antenna ports, identify, based at least in part on the first power ratio, a first downlink shared channel EPRE for two or more OFDM symbols of the narrowband downlink shared channel transmission in which a CRS and a NB-RS are absent and transmit the downlink shared channel transmission to one or more receivers according to the identified first downlink shared channel EPRE.

Some examples of the method, apparatus, or non-transitory computer-readable medium described above may further include processes, features, means, or instructions for identifying a second power ratio between a CRS EPRE and a second EPRE for a resource element of the narrowband downlink shared channel transmission within an OFDM symbol containing the CRS. Some examples of the method, apparatus, or non-transitory computer-readable medium described above may further include processes, features, means, or instructions for the second power ratio to the one or more receivers, wherein the transmitting the downlink shared channel transmission to the one or more receivers comprises transmitting the CRS and the resource element according to the second power ratio.

In some examples of the method, apparatus, or non-transitory computer-readable medium described above, signaling the second power ratio comprises: including a second parameter associated with the second power ratio in a SIB transmitted to the one or more receivers.

Some examples of the method, apparatus, or non-transitory computer-readable medium described above may further include processes, features, means, or instructions for identifying a third power ratio between the NB-RS EPRE and an EPRE of the CRS. Some examples of the method, apparatus, or non-transitory computer-readable medium described above may further include processes, features, means, or instructions for signaling the third power ratio to the one or more receivers, wherein the transmitting the downlink shared channel transmission to the one or more receivers comprises transmitting the NB-RS and the CRS according to the third power ratio.

Some examples of the method, apparatus, or non-transitory computer-readable medium described above may further include processes, features, means, or instructions for determining a fourth power ratio between the NB-RS EPRE and a third EPRE for a resource element of the narrowband downlink shared channel transmission within an OFDM symbol containing the NB-RS based at least in part on the first power ratio.

In some examples of the method, apparatus, or non-transitory computer-readable medium described above, signaling the first power ratio comprises: including a first parameter associated with the first power ratio in RRC signaling transmitted to the one or more receivers.

BRIEF DESCRIPTION OF THE DRAWINGS

A further understanding of the nature and advantages of the present disclosure may be realized by reference to the following drawings. In the appended figures, similar components or features may have the same reference label. Additionally or alternatively, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
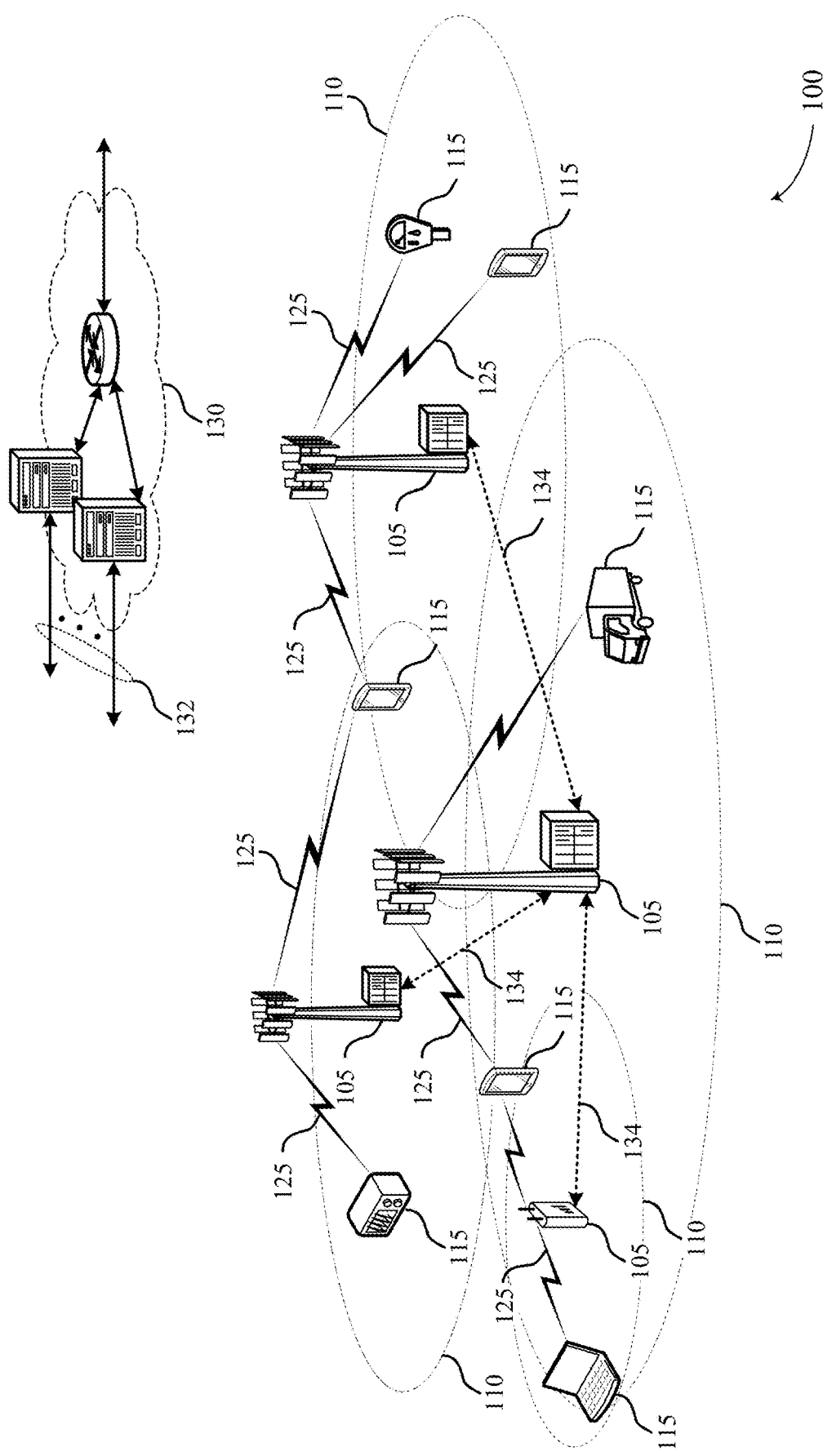
FIG. 1 illustrates an example of a wireless communications system that supports downlink power adjustment in narrowband wireless communications in accordance with various aspects of the present disclosure.

According to the present disclosure, power adjustment in downlink (DL) transmissions to narrowband (NB) devices may be provided by a base station, and the base station may signal one or more power adjustment parameters to a receiving user equipment (UE) for use in receiving and demodulating the DL transmissions. In various examples, a base station may identify one or more ratios of power levels for various different types of transmissions. For example, a base station may identify a narrowband reference signal (NB-RS) energy per resource element (EPRE) for a NB-RS to be transmitted in a NB transmission. The base station may identify a ratio of a narrowband physical downlink shared channel (N-PDSCH) EPRE to the NB-RS EPRE for orthogonal frequency division multiplexing (OFDM) symbols containing neither a cell-specific reference signal (CRS) nor a NB-RS. The relative power levels of the N-PDSCH and NB-RS transmissions may be used by the UE in demodulating the received transmission in order to enhance demodulation of the received transmission. In deployments where NB transmissions are transmitted in a guard-band adjacent to a wideband system bandwidth, a base station may identify a second ratio for N-PDSCH EPRE to CRS EPRE within OFDM symbols containing CRS. In deployments where NB transmissions are transmitted in-band with the wideband system bandwidth, a base station may identify a third ratio of NB-RS EPRE to CRS EPRE, and a fourth ratio of N-PDSCH EPRE to NB-RS EPRE within OFDM symbols containing NB-RS transmissions.

A base station may signal information necessary for a UE to determine one or more of the power ratios. In some examples, one or more power offsets may be signaled, which are based on a presence or absence of a NB-RS or CRS within an OFDM symbol. In stand-alone deployment examples, a single ratio, $\rho_{NA}$ may be a ratio of N-PDSCH EPRE to NB-RS EPRE within OFDM symbols containing neither legacy CRS nor NB-RS. A UE operating in a stand-alone NB deployment may receive a first parameter that indicates the value of $\rho_{NA}$ and demodulate received transmissions based at least in part on the relative powers of the NB-RS and N-PDSCH transmissions that may be determined based on $\rho_{NA}$. Such a UE may additionally or alternatively determine a ratio of N-PDSCH EPRE to NB-RS EPRE within OFDM symbols containing NB-RS, based on the first ratio and a number of antenna ports used for the NB transmission.

In guard-band deployment examples, a UE receiving NB transmissions may receive a second parameter that, by using the first parameter, will indicate ratio, $\rho_B$, which may be a ratio of N-PDSCH EPRE to CRS EPRE within OFDM symbols containing a CRS transmission. A UE operating in a guard-band deployment may receive the first parameter and a second parameter that indicates a parameter that, by using the first parameter, will indicate the value of $\rho_B$, and demodulate received transmissions based at least in part on the relative powers of the CRS, NB-RS and N-PDSCH transmissions. Such a UE may additionally or alternatively determine a ratio of N-PDSCH EPRE to NB-RS EPRE within OFDM symbols containing NB-RS, based on the first ratio and a number of antenna ports used for the NB transmission.

In in-band deployment examples, a UE receiving NB transmissions may receive a third ratio, $\rho_C$, which may be a ratio of NB-RS EPRE to CRS EPRE. A UE operating in an in-band deployment may receive the first parameter, the second parameter, and a third parameter that indicates the value of $\rho_C$. Such a UE may additionally or alternatively determine a fourth ratio of N-PDSCH EPRE to NB-RS EPRE within OFDM symbols containing NB-RS, based on the first ratio and a number of antenna ports used for the NB transmission. The UE may demodulate received transmissions based at least in part on the relative powers of the CRS, NB-RS and N-PDSCH transmissions.

A UE receiving NB transmissions may use the identified power ratios to determine EPRE for different portions of transmissions, and may demodulate received transmissions using the different EPRE values to enhance the likelihood of a successful demodulation of the transmission. In some examples, a UE may use the relative EPRE values to enhance channel estimation based on one or more of the CRS or NB-RS. A UE may additionally or alternatively enhance log likelihood ratio (LLR) calculations across different OFDM symbols using the determined EPRE values. The enhanced channel estimation and LLR calculations may provide enhanced decoding of signals provided in the NB transmissions and thus help provide enhanced demodulation.

In some examples, the different parameters associated with the power ratios may be signaled through a system information block (SIB), radio resource control (RRC) signaling, or combinations thereof. In some examples, the first ratio may be a UE specific parameter signaled to a UE via, for example, RRC signaling, and the second ratio and third ratios may be cell-specific parameters signaled to multiple UEs via, for example, a SIB.

Aspects of the disclosure are described in the context of a wireless communication system. For example, a wireless communication system may support LTE communications in addition to NB communications concurrently on the same or separate wireless channels. Power ratios for different NB transmissions may be determined according to various examples. Aspects of the disclosure are further illustrated by and described with reference to apparatus diagrams, system diagrams, and flowcharts that relate to downlink power adjustment in narrowband wireless communications.

FIG. 1 illustrates an example of a wireless communications system 100 in accordance with various aspects of the present disclosure. The wireless communications system 100 includes base stations 105, UEs 115, and a core network 130. In some examples, the wireless communications system 100 may be a Long Term Evolution (LTE)/LTE-Advanced (LTE-A) network that may also support NB communications to one or more UEs 115.

Base stations 105 may wirelessly communicate with UEs 115 via one or more base station antennas. Each base station 105 may provide communication coverage for a respective geographic coverage area 110. Communication links 125 shown in wireless communications system 100 may include uplink (UL) transmissions from a UE 115 to a base station 105, or DL transmissions, from a base station 105 to a UE 115. UEs 115 may be dispersed throughout the wireless communications system 100, and each UE 115 may be stationary or mobile. A UE 115 may also be referred to as a mobile station, a subscriber station, a remote unit, a wireless device, an access terminal (AT), a handset, a user agent, a client, or like terminology. A UE 115 may also be a cellular phone, a wireless modem, a handheld device, a personal computer, a tablet, a personal electronic device, an machine type communication (MTC) device, etc.

Some types of wireless devices may provide for automated communication. Automated wireless devices may include those implementing Machine-to-Machine (M2M) communication or MTC. M2M or MTC may refer to data communication technologies that allow devices to communicate with one another or a base station without human intervention. For example, M2M or MTC may refer to communications from devices that integrate sensors or meters to measure or capture information and relay that information to a central server or application program that can make use of the information or present the information to humans interacting with the program or application. Some UEs 115 may be narrowband MTC devices, such as those designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging. An MTC device may operate using half-duplex (one-way) communications at a reduced peak rate. MTC devices may also be configured to enter a power saving "deep sleep" mode when not engaging in active communications. MTC devices may be capable of single-tone communications, multi-tone communications, or both. A device that is capable of single-tone communication may transmit using a single tone (subcarrier) per transmission time interval. A multi-tone device may use multiple tones per transmission time interval.

Base stations 105 may communicate with the core network 130 and with one another. For example, base stations 105 may interface with the core network 130 through backhaul links 132 (e.g., S1, etc.). Base stations 105 may communicate with one another over backhaul links 134 (e.g., X2, etc.) either directly or indirectly (e.g., through core network 130). Base stations 105 may perform radio configuration and scheduling for communication with UEs 115, or may operate under the control of a base station controller (not shown). In some examples, base stations 105 may be macro cells, small cells, hot spots, or the like. Base stations 105 may also be referred to as eNodeBs (eNBs) 105.

A base station 105 may insert periodic pilot symbols such as CRS to aid UEs 115 in channel estimation and coherent demodulation. Additionally, base station 105 may insert periodic pilot symbols such as NB-RS into NB communications to aid UEs 115 operating using narrowband communications in channel estimation and coherent demodulation. CRS may include one of 504 different cell identities. They may be modulated using quadrature phase shift keying (QPSK) and power boosted (e.g., transmitted at 6 dB higher than the surrounding data elements) to make them resilient to noise and interference. The ratio of the power-boosted CRS resource elements (REs) relative to N-PDSCH REs of an OFDM symbol may be given, in some examples, by $\rho_B$. CRS may be embedded in 4 to 16 REs in each resource block (RB) based on the number of antenna ports or layers (up to 4) of the receiving UEs 115. In addition to CRS, which may be utilized by all UEs 115 in the coverage area 110 of the base station 105, demodulation reference signal (DMRS) may be directed toward specific UEs 115 and may be transmitted on RBs assigned to those UEs 115. DMRS may include signals on 6 REs in each RB in which they are transmitted.

The DMRS for different antenna ports may each utilize the same 6 REs, and may be distinguished using different orthogonal cover codes (e.g., masking each signal with a different combination of 1 or −1 in different REs). In some cases, two sets of DMRS may be transmitted in adjoining REs. In some cases, additional reference signals known as channel state information (CSI) reference signals (CSI-RS) may be included to aid in generating CSI. On the UL, a UE 115 may transmit a combination of periodic sounding reference signal (SRS) and UL DMRS for link adaptation and demodulation, respectively.

After receiving synchronization information and a master information block (MIB), a UE 115 may receive one or more SIBs. Different SIBs may be defined according to the type of system information (SI) conveyed. SIB1 includes access information such as cell identity (CID) information, and may additionally or alternatively indicate whether a UE 115 is allowed to camp on a cell. SIB1 may additionally or alternatively include cell selection information (or cell selection parameters). Additionally, SIB1 includes scheduling information for other SIBs. SIB2 includes access information and parameters related to common and shared channels (e.g., power parameters that may be used to determine one or more power ratios as discussed herein). SIB3 includes cell reselection parameters. SIB4 and SIB5 include reselection information about neighboring LTE cells. SIB6 through SIB8 include reselection information about non-LTE (e.g., Universal Mobile Telecommunications System (UMTS), Global System for Mobile Communications (GSM), GSM Edge Radio Network (GERAN), and code division multiple access (CDMA) neighboring cells). SIB9 includes the name of a Home evolved node B (eNB). SIB10 through SIB12 include emergency notification information (e.g., tsunami and earthquake warnings). And SIB13 includes information related to multimedia broadcast multicast service (MBMS) configuration.

In some cases, wireless communications system 100 may utilize one or more enhanced component carriers (eCCs). An eCC may be characterized by one or more features including: flexible bandwidth, different transmission time intervals (TTIs), and modified control channel configuration. In some cases, an eCC may be associated with a carrier aggregation (CA) configuration or a dual connectivity configuration (e.g., when multiple serving cells have a suboptimal backhaul link). An eCC may also be configured for use in unlicensed spectrum or shared spectrum (e.g., where more than one operator is licensed to use the spectrum).

An eCC characterized by flexible bandwidth may include one or more segments that may be utilized by UEs 115 that are not capable of monitoring the whole bandwidth or prefer to use a limited bandwidth (e.g., to conserve power). In some cases, an eCC may utilize a different TTI length than other component carriers (CCs), which may include use of a reduced or variable symbol duration as compared with TTIs of the other CCs. The symbol duration may remain the same, in some cases, but each symbol may represent a distinct TTI. In some examples, an eCC may support transmissions using different TTI lengths. For example, some CCs may use uniform 1 ms TTIs, whereas an eCC may use a TTI length of a single symbol, a pair of symbols, or a slot. In some cases, a shorter symbol duration may also be associated with increased subcarrier spacing. In conjunction with the reduced TTI length, an eCC may utilize dynamic time division duplex (TDD) operation (i.e., it may switch from DL to UL operation for short bursts according to dynamic conditions.)

In some cases, a wireless communications system 100 may utilize both LTE and NB radio access technologies. In some examples, NB communications may be used to serve MTC devices. NB communications may use limited frequency resources, and, in some cases, may be limited to a single resource block of system bandwidth (e.g., 180 KHz). In some cases, the frequency resources set aside for NB communications may be located within an LTE carrier, in a guard band of an LTE carrier, or separate from an LTE carrier in a "standalone" deployment. In some cases, the NB resources may be simultaneously utilized by multiple UEs 115. The NB resources may be used to provide deep coverage to support devices in environments that are associated with different coverage enhancement (CE) levels. For instance, certain stationary devices may be located in environments with poor coverage, such as a basement. Additionally, the NB resources may be associated with communications within a large coverage area 110 (e.g., up to 35 kilometers (km)). Communications to a device at an edge of the coverage area 110 may have a large delay (e.g., 200 μs) in comparison to an LTE symbol time (e.g., 72 μs).

In some cases, wireless communications system 100 may utilize CE techniques with either LTE or NB communications to improve the quality of a communication link 125 for UEs 115 located at a cell edge, operating with low power transceivers, or experiencing high interference or path loss. CE techniques may include repeated transmissions, TTI bundling, HARQ retransmission, PUSCH hopping, beamforming, power boosting, repetitive transmissions, or other techniques. The CE techniques used may depend on the specific needs of UEs 115 in different circumstances, and may be effective for reaching devices that are located in areas that routinely experience poor channel conditions. Different CE levels may be associated with different levels of coverage levels enhancements, and may be assigned to UEs 115 based on a signal strength detected at a UE 115. For instance, a device that is near an edge of a coverage area 110 may be associated with a high CE level (e.g., an enhancement of 20 decibels (dBs)), while a device that is near a serving base station 105 may be associated with a low CE level (e.g., no enhancement). In some examples, one or more power adjustment parameters may be selected based upon a CE technique used for a UE.

Figure 2:
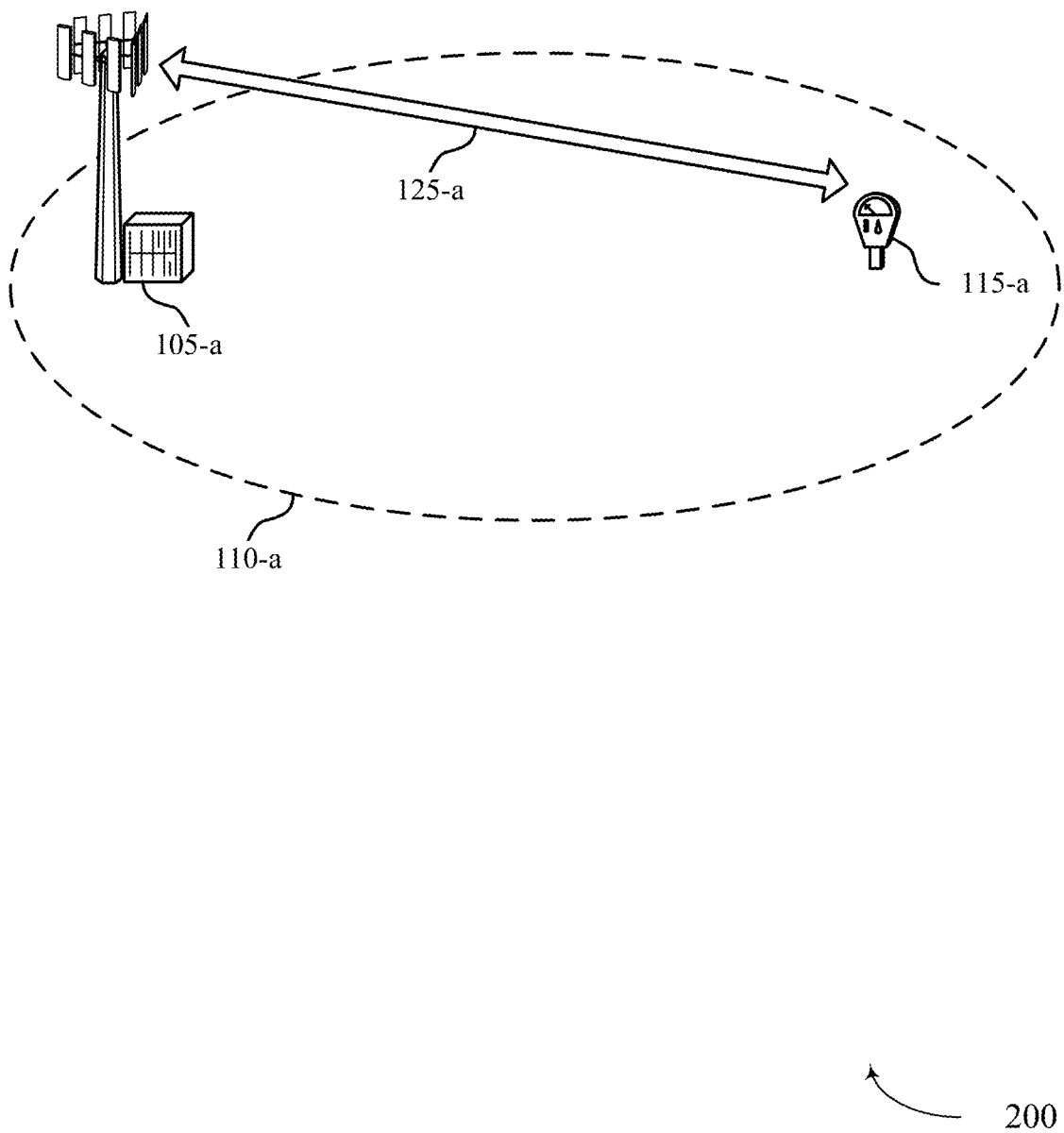
FIG. 2 illustrates an example of a wireless communications system that supports downlink power adjustment in narrowband wireless communications in accordance with various aspects of the present disclosure.

FIG. 2 illustrates an example of a wireless communications system 200 for downlink power adjustment in narrowband wireless communications in accordance with various aspects of the present disclosure. Wireless communications system 200 may include base station 105-a, UE 115-a, and communication link 125-a which may be examples of a UE 115, a base station 105, or a communication link 125 and may communicate with one another over a communication link 125 as described above with reference to FIG. 1. In some examples, UE 115-a may be a NB UE as described above with reference to FIG. 1.

In the example of FIG. 2, communication between UE 115-a and base station 105-a may utilize narrowband transmissions with power adjustments based on one or more ratios of reference signal to N-PDSCH transmissions as discussed herein. In some examples, the NB transmissions may be allocated in a single resource block (e.g., 180 KHz) in consecutive subframes. Furthermore, in some deployments, NB resources for communications link 125-a may be allocated in a stand-alone bandwidth that is separate from a wideband system bandwidth of a legacy LTE system. In other deployments, as indicated above, NB resources for communications link 125-a may be allocated in a guard-band bandwidth that is adjacent to a wideband system bandwidth of a legacy LTE system. In other deployments, as also indicated above, NB resources for communications link 125-a may be allocated in an in-band bandwidth that is within a wideband system bandwidth of a legacy LTE system.

As indicated above, in various examples power adjustment may be used in DL transmissions of communications link 125-a to NB UE 115-a. The base station 105-a may signal one or more power adjustment parameters to the UE 115-a for use in receiving and demodulating the DL transmissions. As indicated above, in some examples base station 105-a may identify one or more ratios of power levels for various different types of transmissions. For example, base station 105-a may identify a NB-RS energy per resource element EPRE for a NB-RS to be transmitted in a NB transmission. The base station 105-a may identify a ratio of a N-PDSCH EPRE to the NB-RS EPRE for OFDM symbols containing neither a CRS nor a NB-RS. The relative power levels of the N-PDSCH and NB-RS transmissions may be used by the UE 115-a in demodulating the received transmission in order to enhance demodulation of the received transmission. In deployments where NB transmissions are transmitted in a guard-band adjacent to a wideband system bandwidth, base station 105-a may identify a second ratio for N-PDSCH EPRE to CRS EPRE within OFDM symbols containing CRS. In deployments where NB transmissions are transmitted in-band with the wideband system bandwidth, base station 105-a may identify a third ratio of NB-RS EPRE to CRS EPRE, and a fourth ratio of N-PDSCH EPRE to NB-RS EPRE within OFDM symbols containing NB-RS transmissions. NB transmissions provided over communications link 125-a may utilize one or more of the power ratios, depending upon the in-band, guard-band, or stand-alone deployment of base station 105-a and UE 115-a.

Base station 105-a may signal information necessary for UE 115-a to determine power ratios associated with NB transmissions of communications link 125-a. UE 115-a may receive the signaling, determine the associated power ratios, and use the determined power ratios to demodulate received NB transmissions. In some examples, the UE 115-a may assume power ratios in the absence of active signaling from the base station. For example, if the number of NB-RS antenna ports is one, the UE 115-a assumes the NB-RS EPRE and the EPRE of all NB DL channels to be the same. In another example, if the number of NB-RS antenna ports is two, the UE 115-a assumes the NB-RS EPRE per antenna port to be 3 dB larger compared to the EPRE per antenna port of all NB DL channels.

Figure 3:
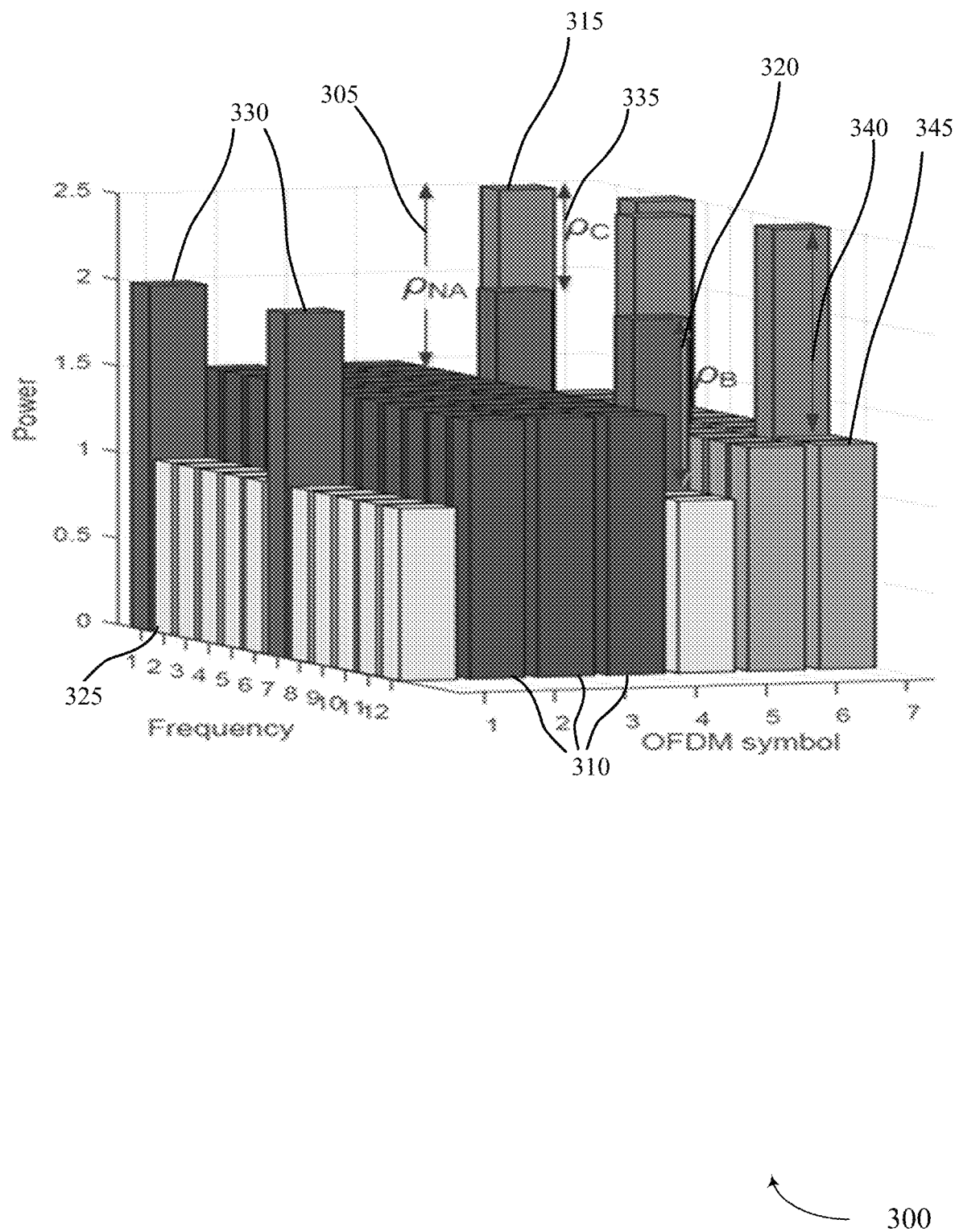
FIG. 3 illustrates an example of relative EPRE values for resources of different OFDM symbols of wireless resources for narrowband wireless communications in accordance with various aspects of the present disclosure.

FIG. 3 illustrates an example of a slot (7 OFDM symbols) for downlink narrowband assignment with a single antenna port, with relative EPRE values for resource elements of different OFDM symbols of wireless resources for narrowband wireless communications, in accordance with various aspects of the present disclosure. In some cases, slot 300 may represent aspects of communications between by a UE 115 or base station 105 as described with reference to FIGS. 1-2. In this example, slot 300 is an example of an in-band NB communications, and has 12 frequency tones and spans seven OFDM symbols. In the example slot 300, CRS 330 may be transmitted in a first symbol and a fifth symbol, while NB-RS 315 may be transmitted in a sixth and a seventh symbol.

For in-band NB transmissions, four power offsets may be present, based on presence or absence of NB-RS and CRS within an OFDM symbol. A first ratio, $\rho_{NA}$ 305, may be a ratio of N-PDSCH EPRE 310 within OFDM symbols containing neither legacy CRS nor NB-RS (i.e., symbols 2, 3, and 4 of the example of slot 300) to NB-RS EPRE 315. A second ratio, $\rho_B$ 320, may be a ratio of N-PDSCH EPRE 325 within OFDM symbols containing CRS (i.e., symbols 1 and 5 of the example of slot 300) to CRS EPRE 330. A third ratio, $\rho_C$ 335, may be a ratio of NB-RS EPRE 315 to CRS EPRE 330. A fourth ratio 340 may be determined based on $\rho_{NA}$ 305, $\rho_B$ 320, and $\rho_C$ 335, and may be a ratio of N-PDSCH EPRE 345 within OFDM symbols containing NB-RS to NB-RS EPRE 315. In some examples, for NB transmissions, similar to legacy LTE, OFDM symbols not-containing CRS (e.g., symbols 2, 3, 6, and 7 within a slot of slot 300) have equal power within NB transmissions. Thus, all of the power offsets between EPREs of different REs may be determined through configuring three relative powers $\rho_{NA}$ 305, $\rho_B$ 320, and $\rho_C$ 335.

In some examples, one or more of the power offsets may be based on a number of antenna ports of NB transmissions. In some examples, the value of the first ratio $\rho_{NA}$ 305 or the fourth ratio 340 may be determined to be a first value for NB transmissions having a single antenna port and a second value for NB transmissions having two antenna ports. Additionally or alternatively, the fourth ratio 340 of N-PDSCH EPRE 345 within OFDM symbols containing NB-RS to NB-RS EPRE 315 may be determined based on the number of antenna ports and the value of $\rho_{NA}$ 305. In some examples, the fourth ratio 340 may be determined according to: Max (0, 1.5 $\rho_{NA}$–0.5) for two antenna ports and determined according to: Max (0, 1.2 $\rho_{NA}$–0.2) for a single antenna port.

In some examples, a base station may signal $\rho_{NA}$ 305 and $\rho_B$ 320 to a NB-IoT UE, for example, by providing two parameters that may be used to determine $\rho_{NA}$ 305 and $\rho_B$ 320. In some example, a base station may provide a first parameter, $P_{NA}$, that may be a UE-specific parameter and signaled through RRC signaling to the UE. The value of $P_{NA}$ may, in some examples, be equal to $\rho_{NA}$ 305. The base station may additionally or alternatively provide a second parameter, $P_B$, that may be a cell-specific parameter that may be signaled by the base station in system information (e.g., in SIB2). The value of $\rho_B$ may, in some examples, be equal to $\rho_A P_B$, where $P_B$ is determined based on the number of antenna ports of the NB transmission in slot 300. In some examples, $\rho_C$ may be configured by the base station, and may be provided explicitly, such as through RRC signaling or provided in a DL grant. In some examples, $\rho_C$ may be implicitly determined, such as based on CE level of the NB UE. For example, a UE may assume the fourth ratio 340 of N-PDSCH EPRE within each OFDM symbol containing NB-RS to NB-RS EPRE is 0 dB for normal coverage and –3 dB for extended coverage. In some examples, a UE may be configured with multiple different fourth ratios that are to be implicitly determined based on a CE level associated with the UE.

While the slot 300 of FIG. 3 illustrates an in-band example, similar power ratios may be used in guard-band and stand-alone deployments. In guard-band deployments, CRS transmissions will not be present in a NB RB, however a CRS transmission may be present during a particular symbol in the adjoining wideband system bandwidth, which may result in the EPRE for the NB transmission during that symbol being adjusted in order to comply with power limits associated with that particular symbol. In some examples, in order to determine the relative power adjustments used in different REs of a NB transmission, a base station may provide two power offsets, namely $\rho_{NA}$ and $\rho_B$, as defined above with respect to in-band deployments. As mentioned above, while a NB transmission in a guard-band deployment may not have CRS transmissions, a UE may still need to know $\rho_B$ in order to determine the power borrowed from in-band RB(s) in OFDM symbols containing CRS in the wideband system bandwidth. Similarly to the in-band example discussed above, guard-band ratios for $\rho_{NA}$ and $\rho_B$ can be configured for a NB UE through signaling of parameters $P_A$ and $P_B$, which a UE may use to determine $\rho_{NA}$ and $\rho_B$. Furthermore, similar to the in-band deployment example discussed above, the ratio of N-PDSCH EPRE within OFDM symbols containing NB-RS to NB-RS EPRE may be based on a number of antenna ports. In some examples, the ratio may be determined to be a first value for a single antenna port and a second value for two antenna ports. Additionally or alternatively, the ratio may depend on the number of antenna ports and $\rho_{NA}$. In some examples, the ratio of N-PDSCH EPRE within OFDM symbols containing NB-RS to NB-RS EPRE may be determined according to, for two antenna ports: Max (0, 1.5 $\rho_{NA}$–0.5); and for a single antenna port: Max (0, 1.2 $\rho_{NA}$–0.2).

In some examples, stand-alone deployments may have NB transmissions with one power ratio that may need to be identified. That one power ratio may be $\rho_{NA}$ which, similarly as indicated above, may be the ratio of N-PDSCH EPRE within OFDM symbols containing neither NB-RS nor legacy CRS (i.e. symbols 2, 3, and 4 within a slot) to NB-RS EPRE. In some examples, $\rho_{NA}$ can be configured using a similar approach as discussed above for in-band and guard-band deployments (e.g., $\rho_{NA}$ may depend on a number of antenna ports). Furthermore, similar to the in-band and guard-band deployment examples discussed above, the ratio of N-PDSCH EPRE within OFDM symbols containing NB-RS to NB-RS EPRE may be based on a number of antenna ports, and may be determined according to, for two antenna ports: Max (0, 1.5 $\rho_{NA}$–0.5); and for a single antenna port: Max (0, 1.2 $\rho_{NA}$–0.2).

A UE that receives the signaling corresponding to the power adjustments as discussed above, and use the relative powers of different REs to provide enhanced demodulation of received NB transmissions. In some examples, knowledge of the different power ratios may allow a NB UE to enhance channel estimation, such as by allowing the UE to perform channel estimation based on both CRS and NB-RS. The different power ratios may additionally or alternatively allow a UE to improve LLR calculations across different OFDM symbols.

Figure 4:
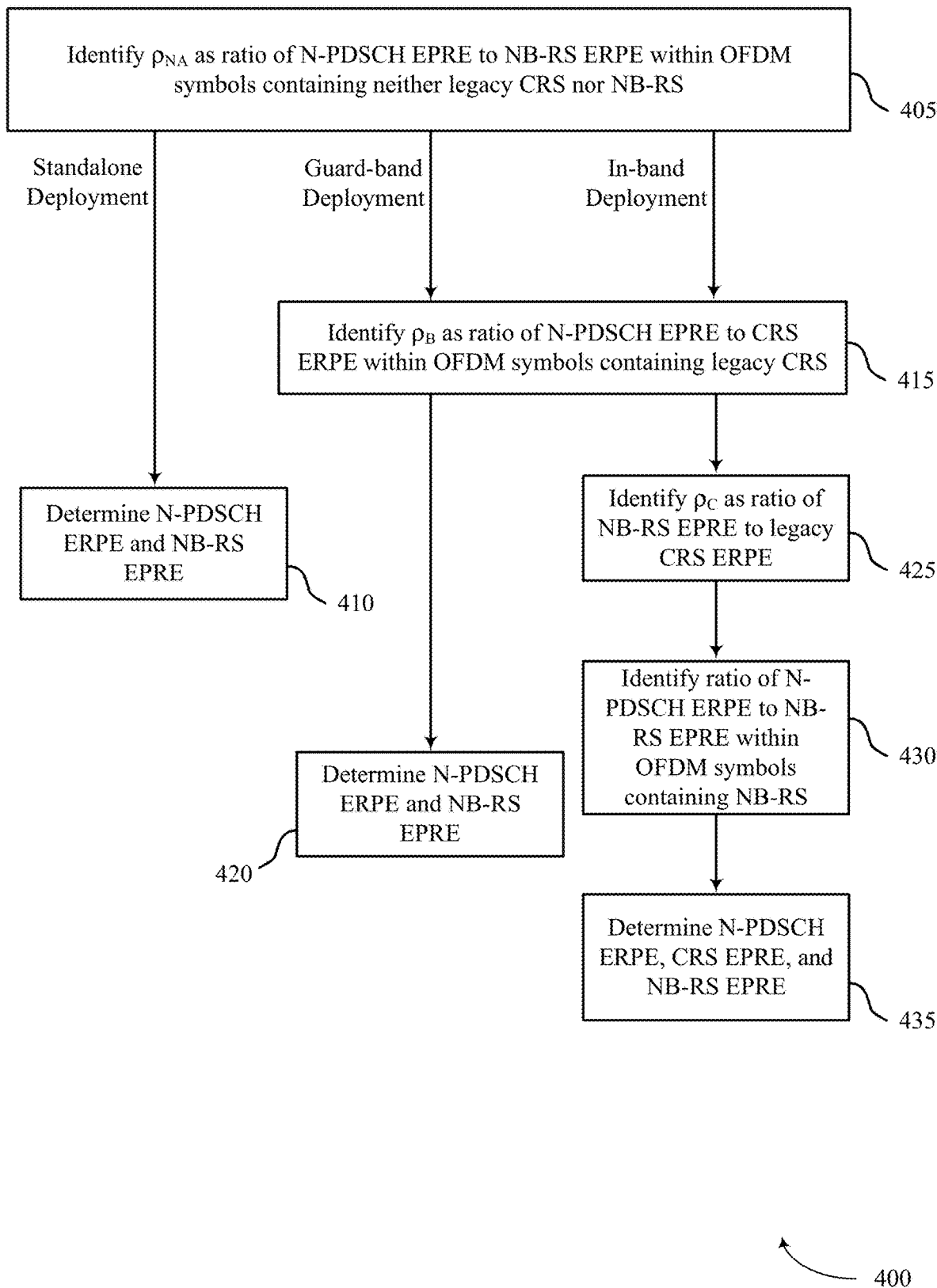
FIG. 4 illustrates an example of a method for downlink power adjustment in narrowband wireless communications in accordance with various aspects of the present disclosure.

FIG. 4 illustrates an example of a method 400 for downlink power adjustment in narrowband wireless communications in accordance with various aspects of the present disclosure. In some cases, method 400 may represent aspects of techniques performed by a UE 115 or base station 105 as described with reference to FIGS. 1-2. The method 400 may be performed by a wireless device such as a UE or a base station as discussed above with respect to FIGS. 1-3.

At block 405, the wireless device may identify $\rho_{NA}$ as ratio of N-PDSCH EPRE within OFDM symbols containing neither legacy CRS nor NB-RS to NB-RS EPRE. For example, a base station may identify $\rho_{NA}$ based on a configured power for NB-RS and available power for the OFDM symbols containing neither legacy CRS nor NB-RS. The base station may signal a parameter associated with $\rho_{NA}$ to a UE, which may identify $\rho_{NA}$ based at least in part on the signaled parameter. In some examples, the signaled parameter may be the ratio $\rho_{NA}$. In other examples, the signaled parameter may be related to $\rho_{NA}$ through a defined relationship that may be configured at a UE.

The wireless device may perform other operations based on a type of deployment for NB communications. If the wireless device is performing NB communications in a stand-alone deployment, the device may, at block 410 determine N-PDSCH EPRE and NB-RS EPRE based on the identified $\rho_{NA}$ ratio. For example, a device may identify the N-PDSCH EPRE, and determine the NB-RS EPRE based on the identified $\rho_{NA}$ ratio. Similarly, a device may identify the NB-RS EPRE, and determine the N-PDSCH EPRE based on the identified $\rho_{NA}$ ratio. In some examples, UE may determine a received power over an OFDM symbol and may determine NB-RS EPRE and N-PDSCH EPRE based on the identified $\rho_{NA}$ ratio.

In examples where the wireless device is operating in a guard-band deployment, the device, at block 415, may identify $\rho_B$ as ratio of N-PDSCH EPRE within OFDM symbols containing legacy CRS to CRS EPRE. For example, a base station may identify $\rho_B$ based on a configured power for CRS and available power for the OFDM symbols containing CRS. The base station may signal a parameter associated with $\rho_B$ to a UE, which may identify $\rho_B$ based at least in part on the signaled parameter. In some examples, the signaled parameter be a value that, when multiplied by the ratio $\rho_{NA}$, provides $\rho_B$.

The wireless device operating in a guard-band deployment may, at block 420, determine N-PDSCH EPRE and NB-RS EPRE based on the identified $\rho_{NA}$ and $\rho_B$ ratios. For example, a device may identify, based on $\rho_{NA}$ and $\rho_B$, the N-PDSCH EPRE for OFDM symbols containing CRS in an adjacent wideband system bandwidth, identify N-PDSCH EPRE for OFDM symbols containing neither CRS nor NB-RS, and may identify the NB-RS EPRE.

If the wireless device is performing NB communications in an in-band deployment, the device may perform the operations of block 415 as discussed above to identify $\rho_B$. At block 425, the device may identify $\rho_C$ as the ratio of NB-RS EPRE to CRS EPRE. The value of $\rho_C$ may be identified and signaled as discussed above with respect to FIG. 3, or, may be given by a default value (e.g., 0 dB) if not identified in the signaling. At block 430, the device operating in an in-band deployment may identify the ratio of N-PDSCH EPRE within OFDM symbols containing NB-RS to NB-RS EPRE. Such an identification may be based on explicit signaling or an implicit determination (e.g., based on CE levels or number of antenna ports), as discussed above with respect to FIG. 3. At block 435, the device may determine N-PDSCH EPRE, CRS EPRE, and NB-RS EPRE based on $\rho_{NA}$, $\rho_B$, and $\rho_C$, as discussed above with respect to FIG. 3.

Figure 5:
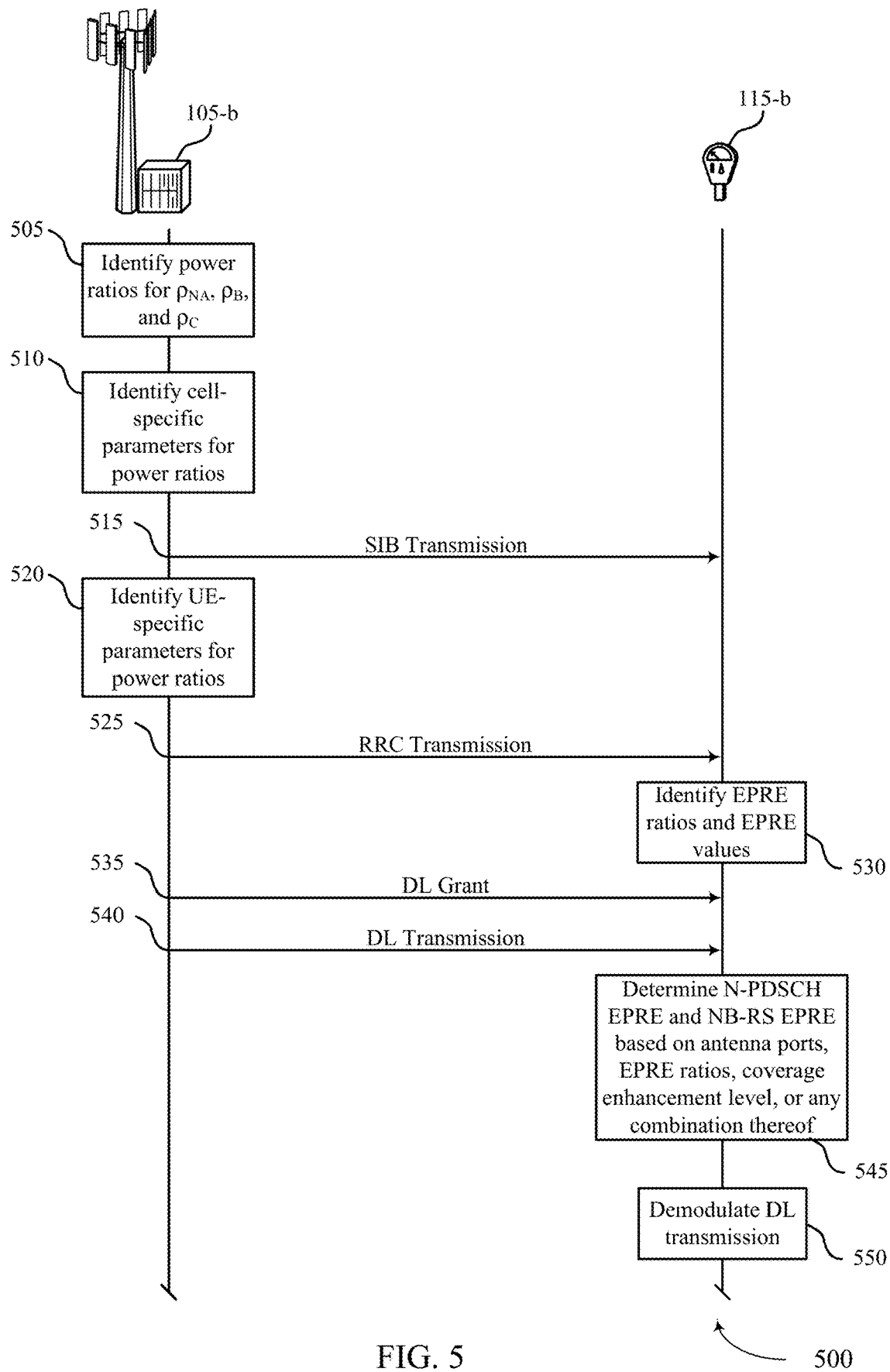
FIG. 5 illustrates an example of a process flow in a system that supports downlink power adjustment in narrowband wireless communications in accordance with various aspects of the present disclosure.

FIG. 5 illustrates an example of a process flow 500 for downlink power adjustment in narrowband wireless communications in accordance with various aspects of the present disclosure. Process flow 500 may include base station 105-b and UE 115-b, which may be examples of the corresponding devices described with reference to FIG. 1-2.

At block 505, base station 105-b may identify power ratios for $\rho_{NA}$, $\rho_B$, and $\rho_C$, in a manner similarly as discussed above. In examples where the base station 105-b and UE 115-b are in an in-band deployment, the base station 105-b may identify each of the ratios for UE 115-b. In examples where the base station 105-b and UE 115-b are in a guard-band deployment, the base station 105-b may identify $\rho_{NA}$ and $\rho_B$ for UE 115-b. In examples where the base station 105-b and UE 115-b are in a stand-alone deployment, the base station 105-b may identify $\rho_{NA}$ for UE 115-b.

At block 510, the base station 105-b may identify cell-specific parameters for power ratios. Such cell-specific parameters may include, for example, a parameter that may be used to determine a ratio of N-PDSCH EPRE within OFDM symbols containing CRS to CRS EPRE. The base station 105-b may identify the cell-specific parameters in a manner as discussed above, such as by identifying a first parameter that may be used to determine $\rho_{NA}$, and a second parameter that may be used to determine $\rho_B$. In some examples, a third parameter that may be used to determine $\rho_C$ may be identified, although in certain examples $\rho_C$ may be implicitly determined (e.g., based on a default value, based on a number of antenna ports, based on a CE level, etc.), similarly as discussed above.

The base station 105-b may transmit the cell-specific parameters in SIB transmission 515. In some examples, the cell-specific parameters may be transmitted in a SIB2 transmission to multiple different UEs.

At block 520, the base station 105-b may identify UE-specific parameters for power ratios. Such UE-specific parameters may include, for example, a parameter that may be used to determine a ratio of N-PDSCH EPRE to NB-RS EPRE within OFDM symbols containing neither NB-RS nor legacy CRS. The base station 105-b may transmit the UE-specific parameters in RRC transmission 525.

The UE 115-b, at block 530, may identify EPRE ratios and EPRE values, based at least in part on the parameters signaled in SIB transmission 515 and RRC transmission 525. The identification of the EPRE ratios and EPRE values may be performed according to techniques as discussed above with respect to FIGS. 2-4. In some examples, the UE 115-b may assume power ratios in the absence of active signaling from the base station 105-b. For example, the UE 115-b may determine the EPRE ratios based on the number of antenna ports. If the number of NB-RS antenna ports is one, the UE 115-b may assume the NB-RS EPRE and the EPRE of all NB DL channels to be the same. In another example, if the number of NB-RS antenna ports is two, the UE 115-b assumes the NB-RS EPRE per antenna port to be 3 dB larger compared to the EPRE per antenna port of all NB DL channels.

The base station 105-b may transmit, and the UE 115-b may receive, DL grant 535. DL grant 535 may include information related to downlink resources for a NB transmission to be received at UE 115-b, and may be followed by DL transmission 540. The DL transmission may be a NB transmission occupying one RB of DL resources.

The UE 115-b may, at block 545, determine N-PDSCH EPRE and NB-RS EPRE based on number of antenna ports, EPRE ratios, coverage enhancement level, measured NB-RS levels, or any combination thereof, similarly as discussed above with respect to FIGS. 2-4. In some examples, as discussed above, UE 115-b may determine certain EPRE values and EPRE ratios based on the deployment of the UE 115-b and base station 105-b (e.g., based on a stand-alone, in-band, or guard-band deployment).

At block 550, the UE 115-b may demodulate the DL transmission employing demodulation techniques that may be enhanced by the determined EPREs and EPRE ratios. In some examples, the UE 115-b may perform a channel estimation based on the relative EPRE values, and may calculate LLRs associated with one or more received REs based on one or more EPRE values. The channel estimation and LLR determinations may be used to demodulate and decode the DL transmission 540.

Figure 6:
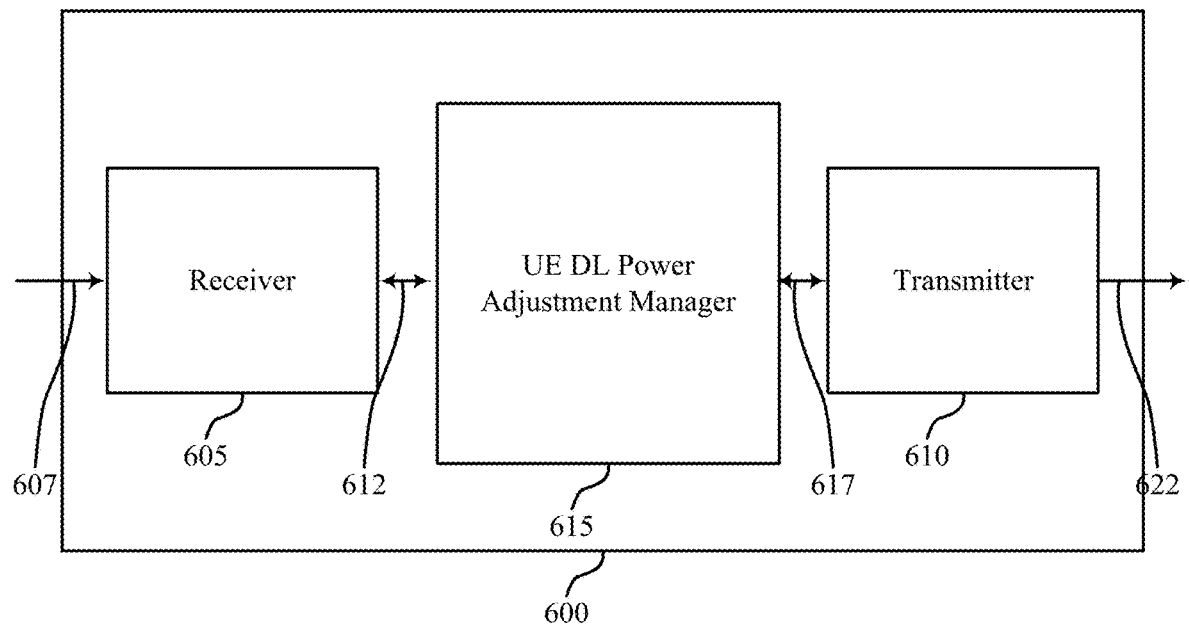
FIGS. 6 through 8 show block diagrams of a wireless device that supports downlink power adjustment in narrowband wireless communications in accordance with various aspects of the present disclosure.

FIG. 6 shows a block diagram of a wireless device 600 that supports downlink power adjustment in narrowband wireless communications in accordance with various aspects of the present disclosure. Wireless device 600 may be an example of aspects of a UE 115 described with reference to FIGS. 1, 2, and 5. Wireless device 600 may include receiver 605, transmitter 610 and UE DL power adjustment manager 615. Wireless device 600 may also include a processor. Each of these components may be in communication with each other.

The receiver 605 may receive signaling 607 via one or more antennas and may perform various operations to process the signaling (e.g., downconversion, analog-to-digital conversion, filtering, baseband processing, etc.). This information may be passed on to other components of the device. The receiver 605 may be an example of aspects of the transceiver 925 described with reference to FIG. 9.

The UE DL power adjustment manager 615 may receive a signal 612, which may be a representation of signal 607 and may include NB-RS, CRS, or NB DL channels. The UE DL power adjustment manager 615 may identify a number of antenna ports used for narrowband transmissions and identify a first power ratio between a first EPRE and a NB-RS EPRE based at least in part on the number of antenna ports. The first EPRE may be an EPRE for two or more OFDM symbols containing neither NB-RS nor CRS. The UE DL power adjustment manager 615 also may identify the first EPRE or the NB-RS EPRE based on the first power ratio. The UE DL power adjustment manager 615 may demodulate at least a portion of an N-PDSCH transmission received in the two or more OFDM symbols based on the identifying. In some cases, the UE DL power adjustment manager 615 may pass information 617 to transmitter 610. The UE DL power adjustment manager 615 may also be an example of aspects of the UE DL power adjustment manager 905 described with reference to FIG. 9.

The transmitter 610 may transmit signals 622 received from other components of wireless device 600. In some examples, the transmitter 610 may be collocated with the receiver 605 in a transceiver module. For example, the transmitter 610 may be an example of aspects of the transceiver 925 described with reference to FIG. 9. The transmitter 610 may include a single antenna, or it may include a plurality of antennas.

Figure 7:
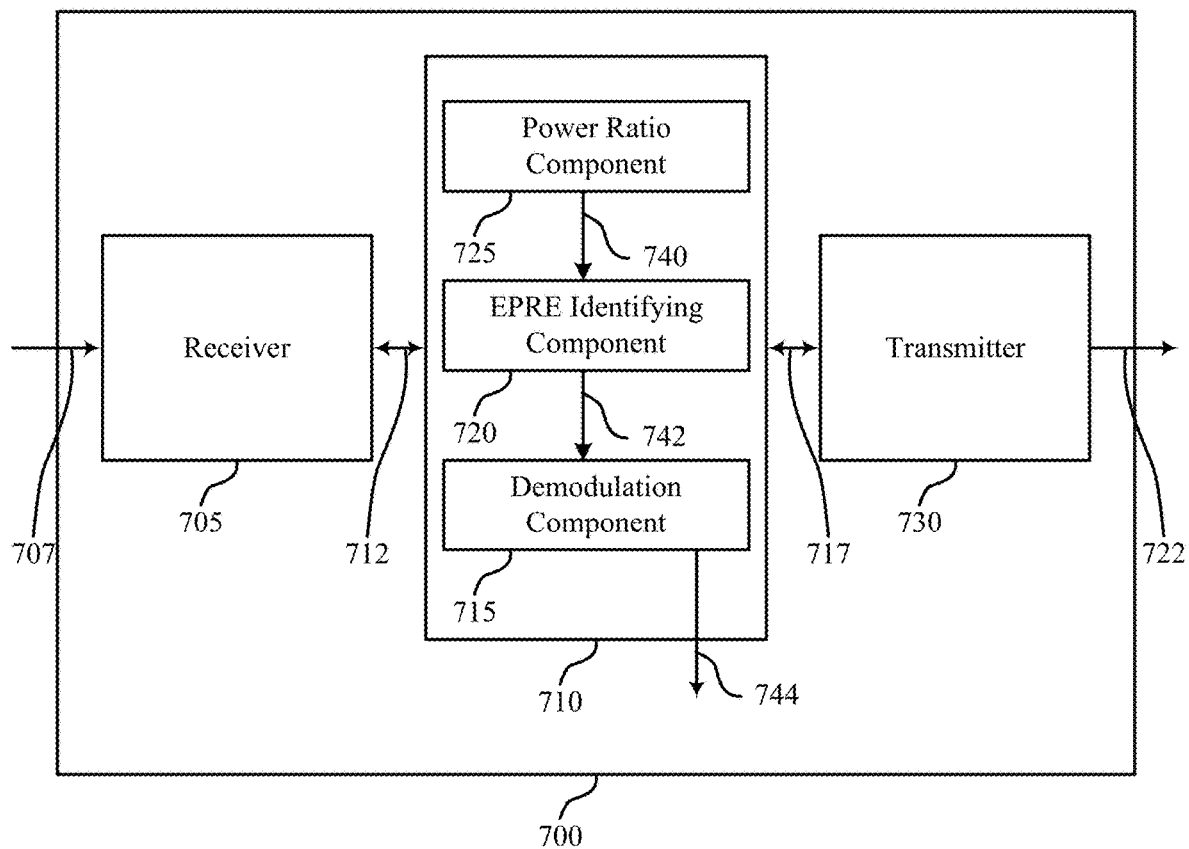

FIG. 7 shows a block diagram of a wireless device 700 that supports downlink power adjustment in narrowband wireless communications in accordance with various aspects of the present disclosure. Wireless device 700 may be an example of aspects of a wireless device 600 or a UE 115 described with reference to FIGS. 1, 2 and 5-6. Wireless device 700 may include receiver 705, UE DL power adjustment manager 710 and transmitter 730. Wireless device 700 may also include a processor. Each of these components may be in communication with each other.

The receiver 705 may receive signaling 707 via one or more antennas and may perform the functions described with reference to the receiver 605 of FIG. 6. The receiver 705 may be an example of aspects of the transceiver 925 described with reference to FIG. 9. Receiver 705 may pass along signal 707, or a representation of signaling 707 (e.g., filtered, digitized, etc.), in signal 712 to UE DL power adjustment manager 710.

The UE DL power adjustment manager 710 may be an example of aspects of UE DL power adjustment manager 615 described with reference to FIG. 6. The UE DL power adjustment manager 710 may include demodulation component 715, EPRE identifying component 720 and power ratio component 725. The UE DL power adjustment manager 710 may be an example of aspects of the UE DL power adjustment manager 905 described with reference to FIG. 9.

The power ratio component 725 may identify factors for determining one or more power ratios for an NB transmission. For example, the power ratio component 725 may identify cell-specific or UE-specific parameters sent from a base station in signal 712. In some examples, the power ratio component 725 may identify a number of antenna ports used for the NB transmission. The power ratio component 725 may determine the one or more power ratios for the NB transmission based on the parameters and/or number of antenna ports. For example, a first power ratio between EPRE for two or more OFDM symbols in which a CRS and a NB-RS are absent and an NB-RS EPRE may be determined. In certain examples, the power ratio component 725 may identify a second power ratio between a CRS EPRE and a second EPRE for a RE containing the downlink shared channel transmission within an OFDM symbol containing the CRS. In some examples, the power ratio component 725 may identify a third power ratio between the NB-RS EPRE and the CRS EPRE, and may determine a fourth power ratio between the NB-RS EPRE and a third EPRE for a RE containing the downlink shared channel transmission within an OFDM symbol containing the NB-RS based on the first power ratio, the second power ratio, the third power ratio, or any combination thereof. In some examples, the power ratio component 725 may pass the identified power ratios 740 to EPRE identifying component 720.

The EPRE identifying component 720 may also receive signal 712, which may include one or more downlink channels of an NB transmission and identify the EPREs for various REs of the NB transmission. For example, the EPRE identifying component 720 may identify the EPRE of a DL data channel (e.g., REs of N-PDSCH) or EPRE of NB-RS or CRS based on measurements of NB-RS, CRS, or the DL data channel and one or more of the power ratios 740. In some examples, the EPRE identifying component 720 may identify N-PDSCH EPRE within OFDM symbols containing neither legacy CRS nor NB-RS, N-PDSCH EPRE within OFDM symbols containing CRS, or N-PDSCH EPRE within OFDM symbols containing NB-RS based on the identified power ratios 740. Identifying the EPREs may be based on an in-band or guard-band deployment. In some examples, the EPRE identifying component 720 may identify, based on a second power ratio, the CRS EPRE, the second EPRE, or both. The identification of EPRE for NB-RS or CRS may be based on a ratio $\rho_C$, which may be explicitly signaled or a default ratio, in some cases. The EPRE identifying component 720 may pass the EPREs 742 (e.g., EPREs for REs of a DL data channel, NB-RS, or CRS) to demodulation component 715.

The demodulation component 715 may receive signaling 712 and demodulate at least a portion of a N-PDSCH transmission received in the two or more OFDM symbols based on the identified power ratios and relative EPRE values 742. In some cases, the demodulation component 715 may perform a channel estimation based on the relative EPRE values, and may calculate LLRs associated with one or more received REs based on one or more EPRE values. In some examples, the demodulation component 715 may pass demodulated symbols 744 (e.g., LLRs, etc.) of an N-PDSCH transmission to other components within wireless device 700 (e.g., a decoder, etc.) for further processing. The demodulation component 715 may pass the channel estimation to transmitter 730 via signal 717 for channel feedback.

The transmitter 730 may transmit signaling 722 based on signaling 717 received from other components of wireless device 700. For instance, UE DL power adjustment manager 710 may pass information 717 to transmitter 730. In some examples, the transmitter 730 may be collocated with a receiver 705 in a transceiver module. For example, the transmitter 730 may be an example of aspects of the transceiver 925 described with reference to FIG. 9. The transmitter 730 may utilize a single antenna, or it may utilize a plurality of antennas.

Figure 8:
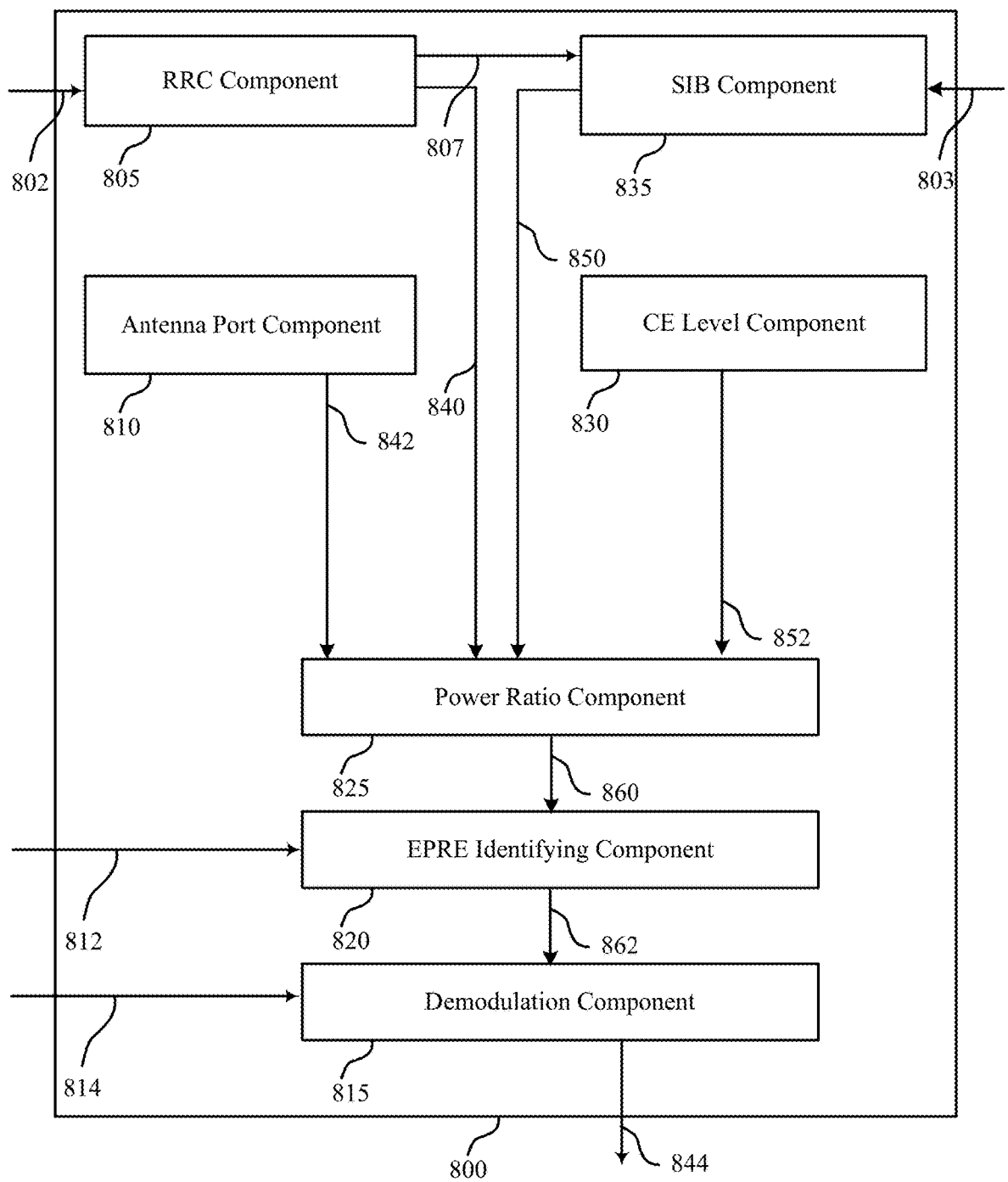

FIG. 8 shows a block diagram of a UE DL power adjustment manager 800 which may be an example of the corresponding component of wireless device 600 or wireless device 700 in accordance with various aspects of the present disclosure. That is, UE DL power adjustment manager 800 may be an example of aspects of UE DL power adjustment manager 615 or UE DL power adjustment manager 710 described with reference to FIGS. 6 and 7. The UE DL power adjustment manager 800 may also be an example of aspects of the UE DL power adjustment manager 905 described with reference to FIG. 9.

The UE DL power adjustment manager 800 may include RRC component 805, antenna port component 810, demodulation component 815, EPRE identifying component 820, power ratio component 825, CE level component 830 and SIB component 835. Each of these modules may communicate, directly or indirectly, with one another (e.g., via one or more buses).

The RRC component 805 may manage RRC layer communications. In some examples, the RRC component 805 may receive a first power parameter in RRC signaling via signal 802. In some cases, the RRC component 805 may determine the first power ratio on the first power parameter. RRC component 805 may pass the first power ratio and/or the first power parameter 840 to power ratio component 825. RRC component 805 may pass the first power ratio 807 to SIB component 835.

The antenna port component 810 may identify a number of antenna ports used for narrowband transmissions. The number of antenna ports may be identified based on, for example, a transmission mode for the narrowband transmission. Antenna port component 810 may pass the identified number of antenna ports 842 to power ratio component 825.

The SIB component 835 may identify SIB communications from a base station 105. In some examples, the SIB component 835 may receive a second power parameter in SIB communications 803. The SIB component 835 may receive the first ratio 807 from the RRC component 805. In some cases, identifying the second power ratio includes receiving a second power parameter in SIB communications 803, and determining the second power ratio based on the second power parameter and the first power ratio 807. RRC component 805 may pass the second power ratio 850 to power ratio component 825.

The CE level component 830 may determine a CE level for communications. In some cases, the CE level component 830 may determine a third power ratio based on a configured CE level. In some examples, the CE level component 830 may pass the third power ratio 852 to power ratio component 825.

The power ratio component 825 may receive the first power ratio and/or the first power parameter 840 from the RRC component 805. In some examples, the power ratio component 825 may receive a number of antenna ports 842 from the antenna port component 810. In some examples, the power ratio component 825 may receive the second power ratio 850 from the SIB component 835. In some examples, the power ratio component 825 may receive the third power ratio 852 from the CE level component 830. The power ratio component 825 may determine a first power ratio based on the first power parameter 840 and, in some examples, additional parameters such as the number of antenna ports 842. In some cases, the power ratio component 825 may identify one or more of the other power ratios as discussed herein. In some examples, the power ratio component 825 may pass the identified power ratios 860 to EPRE identifying component 820.

The EPRE identifying component 820 may also receive signal 812, which may include one or more downlink channels of an NB transmission and identify the EPREs for various REs of the NB transmission. For example, the EPRE identifying component 820 may identify the EPRE of a DL data channel (e.g., REs of N-PDSCH) or EPRE of NB-RS or CRS based on measurements of NB-RS, CRS, or the DL data channel and one or more of the power ratios 860. The EPRE identifying component 820 may identify, based on the first power ratio 860, the first EPRE, the NB-RS EPRE, or both. In some examples, the EPRE identifying component 820 may identify, based on the second power ratio 860, the CRS EPRE, the second EPRE, or both. In certain examples, the EPRE identifying component 820 may identify, based on the third power ratio 860, the CRS EPRE, the NB-RS EPRE, or both. The EPRE identifying component 820 may pass the EPREs 862 (e.g., EPREs for REs of a DL data channel, NB-RS, or CRS) to demodulation component 815.

The demodulation component 815 may receive signaling 814 (e.g., from receiver 605 or 705) and demodulate at least a portion of a N-PDSCH transmission received in the signaling 814. For example, the demodulation component 815 may demodulate two or more OFDM symbols of an N-PDSCH transmission based on the identified power ratios and relative EPRE values 862. In some cases, demodulating at least the portion of the N-PDSCH transmission may include performing a channel estimation based on relative EPREs, and a LLR calculation for one or more received REs based on one or more EPREs. In some examples, the demodulation component 815 may pass demodulated symbols 844 (e.g., LLRs, etc.) of an N-PDSCH transmission to other components within wireless device 800 (e.g., a decoder, etc.) for further processing.

Figure 9:
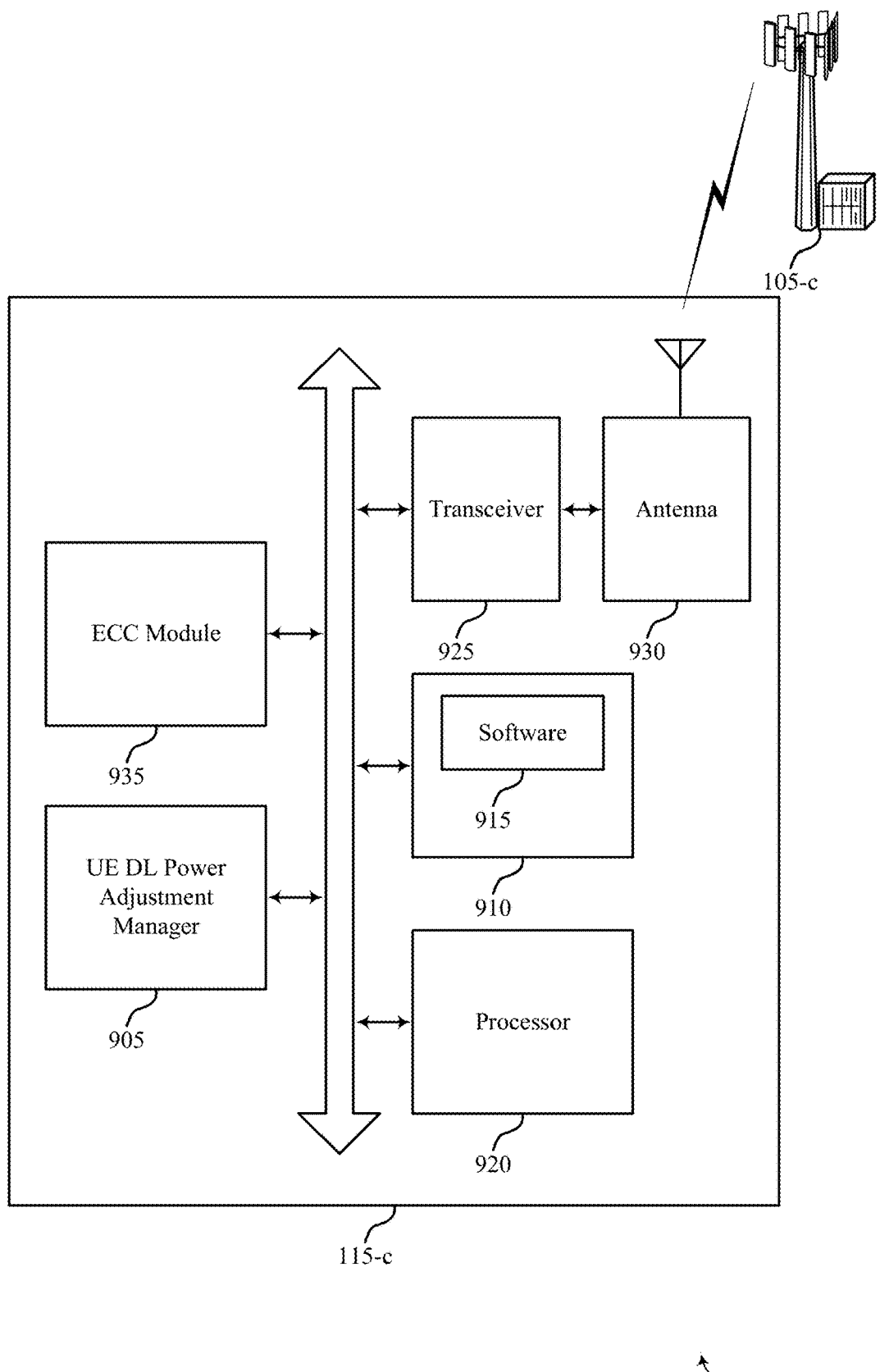
FIG. 9 illustrates a block diagram of a system including a UE that supports downlink power adjustment in narrowband wireless communications in accordance with various aspects of the present disclosure.

FIG. 9 shows a diagram of a system 900 including a device that supports downlink power adjustment in narrowband wireless communications in accordance with various aspects of the present disclosure. For example, system 900 may include UE 115-c, which may be an example of a wireless device 600, a wireless device 700, or a UE 115 as described with reference to FIGS. 1, 2 and 5 through 8.

UE 115-c may include UE DL power adjustment manager 905, memory 910, processor 920, transceiver 925, antenna 930 and ECC module 935. Each of these modules may communicate, directly or indirectly, with one another (e.g., via one or more buses). The UE DL power adjustment manager 905 may be an example of a UE DL power adjustment manager as described with reference to FIGS. 6 through 8.

The memory 910 may include random access memory (RAM) and read only memory (ROM). The memory 910 may store computer-readable, computer-executable software including instructions that, when executed, cause the processor to perform various functions described herein (e.g., downlink power adjustment in narrowband wireless communications, etc.). In some cases, the software 915 may not be directly executable by the processor but may cause a computer (e.g., when compiled and executed) to perform functions described herein. The processor 920 may include an intelligent hardware device, (e.g., a central processing unit (CPU), a microcontroller, an application specific integrated circuit (ASIC), etc.)

The transceiver 925 may communicate bi-directionally, via one or more antennas, wired, or wireless links, with one or more networks, as described above. For example, the transceiver 925 may communicate bi-directionally with a base station 105 or a UE 115. The transceiver 925 may also include a modem to modulate the packets and provide the modulated packets to the antennas for transmission, and to demodulate packets received from the antennas. In some cases, the wireless device may include a single antenna 930. However, in some cases the device may have more than one antenna 930, which may be capable of concurrently transmitting or receiving multiple wireless transmissions.

ECC module 935 may enable operations using eCCs such as communication using shared or unlicensed spectrum, using reduced TTIs or subframe durations, or using a large number of component carriers.

Figure 10:
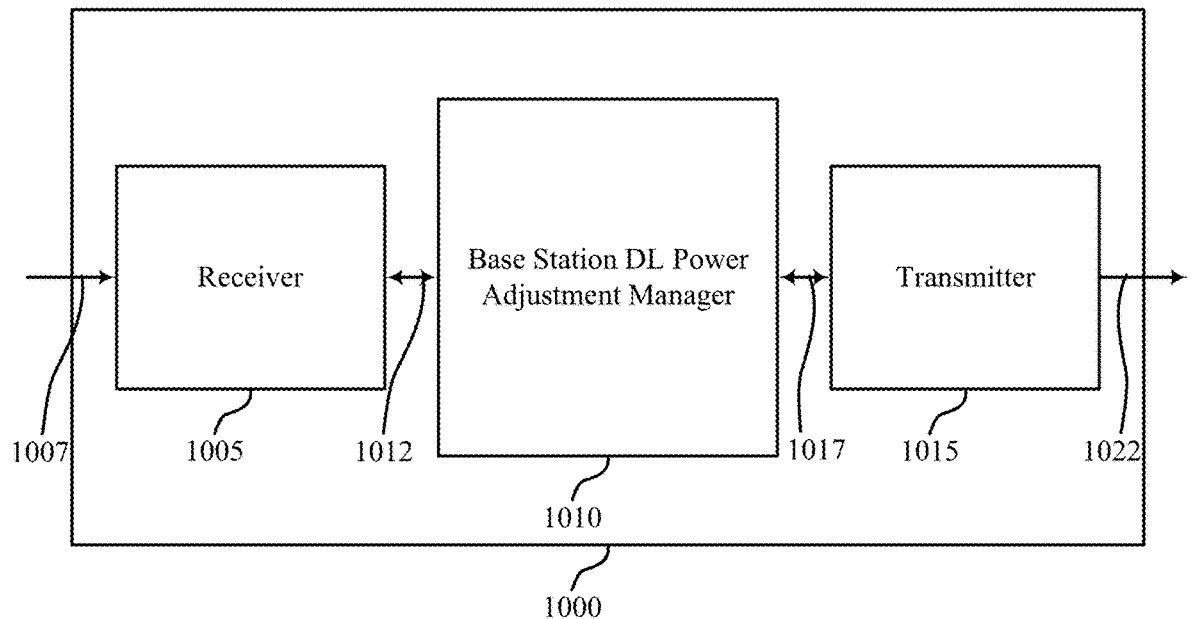
FIGS. 10 through 12 show block diagrams of a wireless device that supports downlink power adjustment in narrowband wireless communications in accordance with various aspects of the present disclosure.

FIG. 10 shows a block diagram of a wireless device 1000 that supports downlink power adjustment in narrowband wireless communications in accordance with various aspects of the present disclosure. Wireless device 1000 may be an example of aspects of a base station 105 described with reference to FIGS. 1 and 2. Wireless device 1000 may include receiver 1005, base station DL power adjustment manager 1010 and transmitter 1015. Wireless device 1000 may also include a processor. Each of these components may be in communication with each other.

The receiver 1005 may receive information such as packets, user data, or control information associated with various information channels (e.g., control channels, data channels, and information related to downlink power adjustment in narrowband wireless communications, etc.) in signal 1007. Information may be passed on to other components of the device. This information and/or signal 1007 may be passed on to other components of the device. The receiver 1005 may be an example of aspects of the transceiver 1325 described with reference to FIG. 13.

The base station DL power adjustment manager 1010 may receive signals 1012, which may be a representation of a signal 1007. The base station DL power adjustment manager 1010 may identify a first N-PDSCH EPRE for two or more OFDM symbols in which a CRS and a NB-RS are absent, identify a first power ratio between the first N-PDSCH EPRE and a NB-RS EPRE, and signal the first power ratio to one or more receivers. Base station DL power adjustment manager 1010 may pass signals 1017 indicating the first N-PDSCH EPRE and the first power ratio between the first N-PDSCH EPRE and a NB-RS EPRE, to transmitter 1015. The base station DL power adjustment manager 1010 may also be an example of aspects of the base station DL power adjustment manager 1305 described with reference to FIG. 13.

The transmitter 1015 may transmit signals 1022 received from other components of wireless device 1000. Signals 1022 may be transmitted to other devices including the first power ratio between the first N-PDSCH EPRE and a NB-RS EPRE. In some examples, the transmitter 1015 may be collocated with a receiver in a transceiver module. For example, the transmitter 1015 may be an example of aspects of the transceiver 1325 described with reference to FIG. 13. The transmitter 1015 may include a single antenna, or it may include a plurality of antennas.

Figure 11:
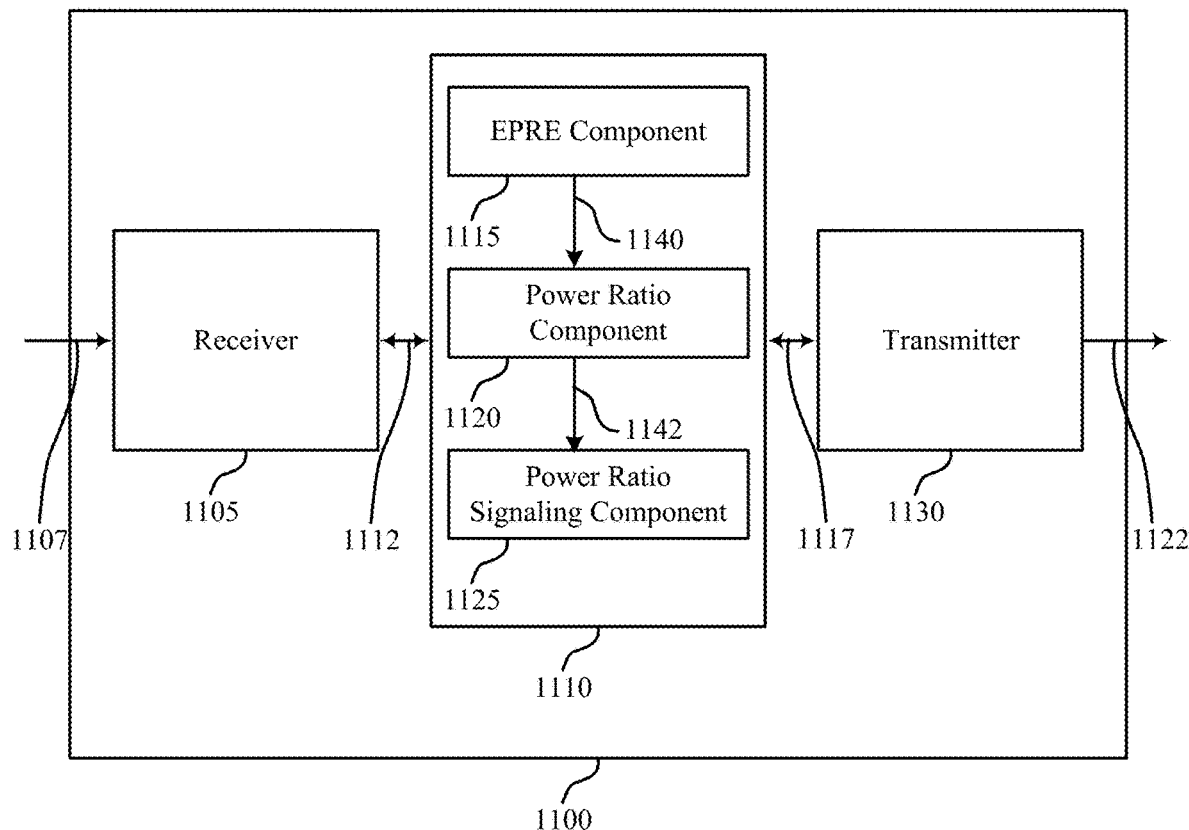

FIG. 11 shows a block diagram of a wireless device 1100 that supports downlink power adjustment in narrowband wireless communications in accordance with various aspects of the present disclosure. Wireless device 1100 may be an example of aspects of a wireless device 1000 or a base station 105 described with reference to FIGS. 1, 2, 5 and 10. Wireless device 1100 may include receiver 1105, base station DL power adjustment manager 1110 and transmitter 1130. Wireless device 1100 may also include a processor. Each of these components may be in communication with each other.

The receiver 1105 may receive information such as packets, user data, or control information associated with various information channels (e.g., control channels, data channels, and information related to downlink power adjustment in narrowband wireless communications, etc.) in signal 1107. This information may be passed on to other components of the device. The receiver 1105 may also perform the functions described with reference to the receiver 1005 of FIG. 10. The receiver 1105 may be an example of aspects of the transceiver 1325 described with reference to FIG. 13. Receiver 1105 may pass along signal 1107, or a representation of signal 1107 (e.g., filtered, digitized, etc.), in signal 1112 to base station DL power adjustment manager 1110.

The base station DL power adjustment manager 1110 may be an example of aspects of base station DL power adjustment manager 1010 described with reference to FIG. 10. The base station DL power adjustment manager 1110 may include EPRE component 1115, power ratio component 1120 and power ratio signaling component 1125. The base station DL power adjustment manager 1110 may be an example of aspects of the base station DL power adjustment manager 1305 described with reference to FIG. 13.

The EPRE identifying component 1115 may identify a first N-PDSCH EPRE for two or more OFDM symbols in which a CRS and a NB-RS are absent. The EPRE identifying component 1115 may pass the EPREs 1140 (e.g., N-PDSCH EPRE) to power ratio component 1120.

The power ratio component 1120 may receive the EPREs 1140 from the EPRE component 1115. The power ratio component 1120 may identify a first power ratio between the first N-PDSCH EPRE and a NB-RS EPRE, identify a second power ratio between a CRS EPRE and a second EPRE for a RE containing the N-PDSCH transmission within an OFDM symbol containing the CRS, identify a third power ratio between the NB-RS EPRE and the CRS EPRE, and determine a fourth power ratio between the NB-RS EPRE and a third EPRE for a RE containing the N-PDSCH transmission within an OFDM symbol containing the NB-RS based on the first power ratio, the second power ratio, the third power ratio, or any combination thereof. In some examples, the power ratio component 1120 may apply the power ratios to NB transmission signals to be transmitted via transmitter 1130, according to the received EPREs 1140. In some examples, the power ratio component 1120 may pass the identified power ratios 1142 to power ratio signaling component 1125.

The power ratio signaling component 1125 may receive the identified power ratios 1142 from the power ratio component 1120. The power ratio signaling component 1125 may signal the first power ratio to one or more receivers, signal the second power ratio to the one or more receivers, and signal the third power ratio to the one or more receivers. The power ratio signaling component 1125 may pass along the power ratios applied to transmission signals, to one or more receivers. The power ratio signaling component 1125 may pass along signal 1117, to transmitter 1130. In some examples, the signal 1117 may include the one or more power ratios for signaling to the one or more receivers.

The transmitter 1130 may transmit signals 1122 received from other components of wireless device 1100. For instance, base station DL power adjustment manager 1110 may pass information 1117 to transmitter 1130. In some examples, the transmitter 1130 may be collocated with a receiver in a transceiver module. For example, the transmitter 1130 may be an example of aspects of the transceiver 1325 described with reference to FIG. 13. The transmitter 1130 may utilize a single antenna, or it may utilize a plurality of antennas.

Figure 12:
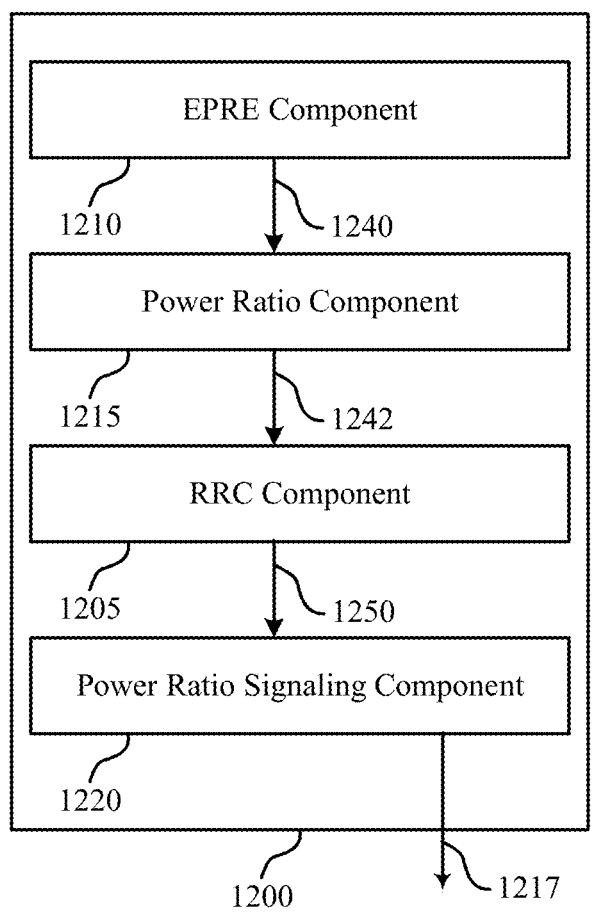

FIG. 12 shows a block diagram of a base station DL power adjustment manager 1200 which may be an example of the corresponding component of wireless device 1000 or wireless device 1100 in accordance with various aspects of the present disclosure. That is, base station DL power adjustment manager 1200 may be an example of aspects of base station DL power adjustment manager 1010 or base station DL power adjustment manager 1110 described with reference to FIGS. 10 and 11. The base station DL power adjustment manager 1200 may also be an example of aspects of the base station DL power adjustment manager 1305 described with reference to FIG. 13.

The base station DL power adjustment manager 1200 may include RRC component 1205, EPRE component 1210, power ratio component 1215 and power ratio signaling component 1220. Each of these modules may communicate, directly or indirectly, with one another (e.g., via one or more buses).

The EPRE identifying component 1210 may identify a first N-PDSCH EPRE for two or more OFDM symbols in which a CRS and a NB-RS are absent. The EPRE identifying component 1210 may pass the EPREs 1240 to power ratio component 1215.

The power ratio component 1215 may receive the EPREs 1240 from the EPRE component 1210. The power ratio component 1215 may identify a first power ratio between the first N-PDSCH EPRE and a NB-RS EPRE, identify a second power ratio between a CRS EPRE and a second EPRE for a RE containing the N-PDSCH transmission within an OFDM symbol containing the CRS, identify a third power ratio between the NB-RS EPRE and the CRS EPRE, and determine a fourth power ratio between the NB-RS EPRE and a third EPRE for a RE containing the N-PDSCH transmission within an OFDM symbol containing the NB-RS based on the first power ratio, the second power ratio, the third power ratio, or any combination thereof. The power ratio component 1215 may pass the power ratios 1242 to power ratio component 1215.

The RRC component 1205 may receive power ratios 1242 from the power ratio component 1215. The RRC component 1205 may manage RRC communications. In some cases, signaling the first power ratio includes including a first parameter associated with the first power ratio in RRC signaling transmitted to the one or more receivers. The RRC component 1205 may pass the first parameter associated with the first power ratio included in RRC signaling 1250, to power ratio signaling component 1220.

The power ratio signaling component 1220 may signal the first power ratio to one or more receivers, signal the second power ratio to the one or more receivers, or signal the third power ratio to the one or more receivers. In some cases, signaling the power ratios may include signaling one or more parameters associated with the power ratios in a SIB or RRC transmission to the one or more receivers. In some examples, the power ratio signaling component 1220 may pass signal 1217 to a transmitter. In some examples, the signal 1217 may include the one or more power ratios to be signaled.

Figure 13:
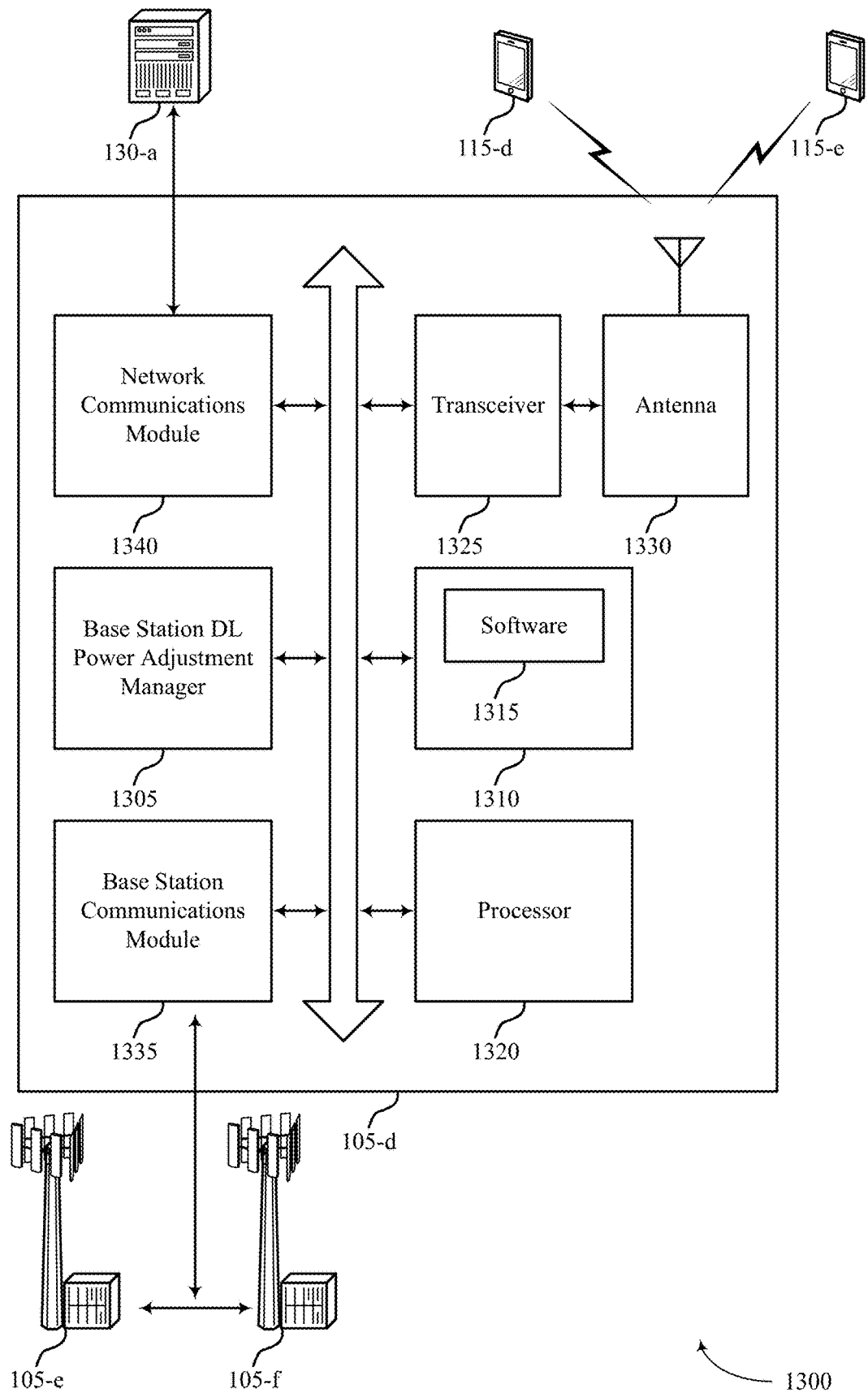
FIG. 13 illustrates a block diagram of a system including a base station that supports downlink power adjustment in narrowband wireless communications in accordance with various aspects of the present disclosure.

FIG. 13 shows a diagram of a wireless system 1300 including a device configured that supports downlink power adjustment in narrowband wireless communications in accordance with various aspects of the present disclosure. For example, system 1300 may include base station 105-*d*, which may be an example of a wireless device 1000, a wireless device 1100, or a base station 105 as described with reference to FIGS. 1, 2 and 10 through 12. Base station 105-*d* may also include components for bi-directional voice and data communications including components for transmitting communications and components for receiving communications. For example, base station 105-*d* may communicate bi-directionally with one or more UEs 115.

Base station 105-*d* may also include base station DL power adjustment manager 1305, memory 1310, processor 1320, transceiver 1325, antenna 1330, base station communications module 1335 and network communications module 1340. Each of these modules may communicate, directly or indirectly, with one another (e.g., via one or more buses). The base station DL power adjustment manager 1305 may be an example of a base station DL power adjustment manager as described with reference to FIGS. 10 through 12.

The memory 1310 may include RAM and ROM. The memory 1310 may store computer-readable, computer-executable software including instructions that, when executed, cause the processor to perform various functions described herein (e.g., downlink power adjustment in narrowband wireless communications, etc.). In some cases, the software 1315 may not be directly executable by the processor but may cause a computer (e.g., when compiled and executed) to perform functions described herein. The processor 1320 may include an intelligent hardware device, (e.g., a CPU, a microcontroller, an ASIC, etc.).

The transceiver 1325 may communicate bi-directionally, via one or more antennas, wired, or wireless links, with one or more networks, as described above. For example, the transceiver 1325 may communicate bi-directionally with a base station 105 or a UE 115. The transceiver 1325 may also include a modem to modulate the packets and provide the modulated packets to the antennas for transmission, and to demodulate packets received from the antennas. In some cases, the wireless device may include a single antenna 1330. However, in some cases the device may have more than one antenna 930, which may be capable of concurrently transmitting or receiving multiple wireless transmissions.

The base station communications module 1335 may manage communications with other base station 105, and may include a controller or scheduler for controlling communications with UEs 115 in cooperation with other base stations 105. For example, the base station communications module 1335 may coordinate scheduling for transmissions to UEs 115 for various interference mitigation techniques such as beamforming or joint transmission. In some examples, base station communications module-95 may provide an X2 interface within an LTE/LTE-A wireless communication network technology to provide communication between base stations 105.

The network communications module 1340 may manage communications with the core network (e.g., via one or more wired backhaul links). For example, the network communications module 1340 may manage the transfer of data communications for client devices, such as one or more UEs 115.

Figure 14:
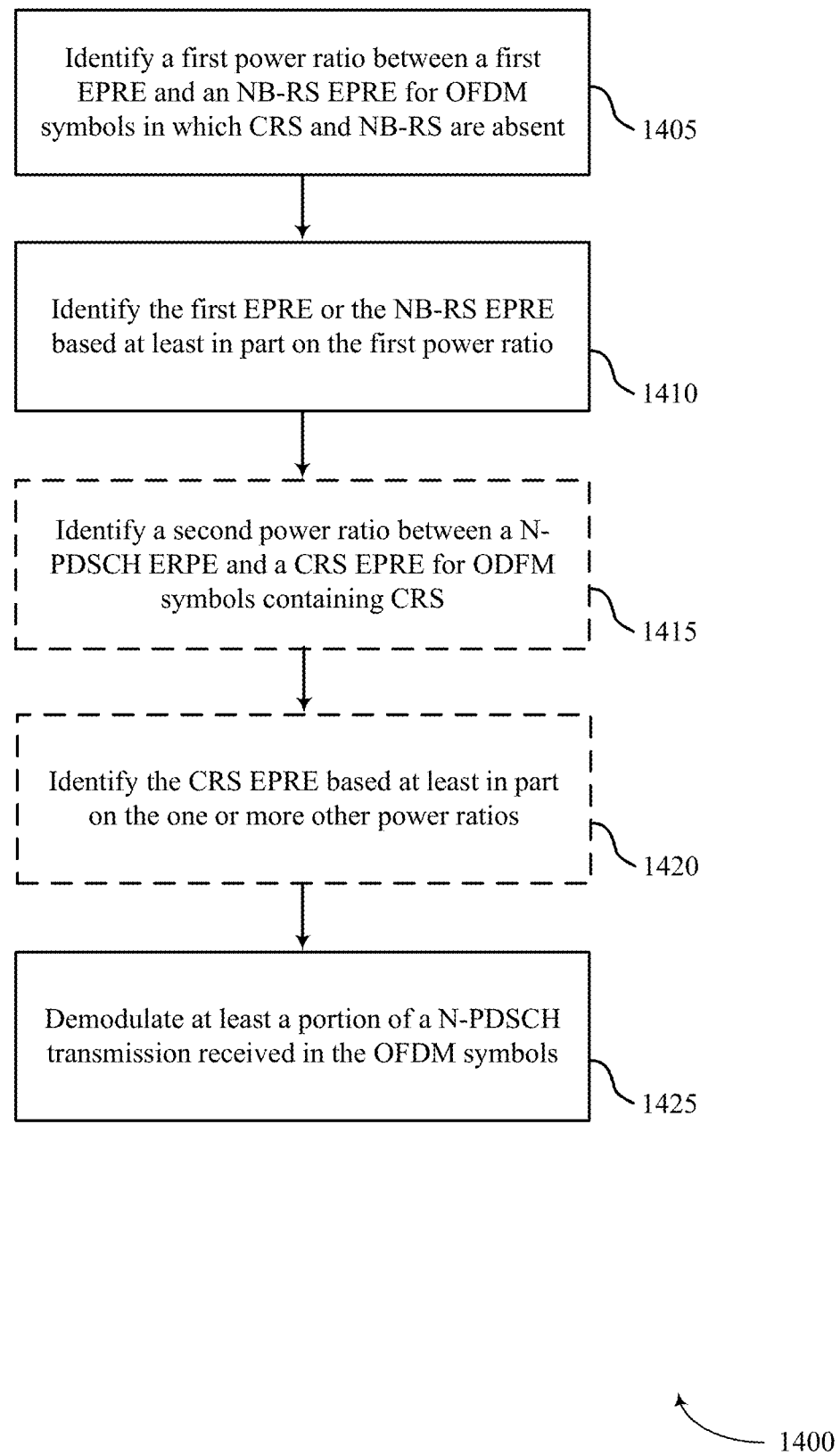
FIGS. 14 through 15 illustrate methods for downlink power adjustment in narrowband wireless communications in accordance with various aspects of the present disclosure.

FIG. 14 shows a flowchart illustrating a method 1400 for downlink power adjustment in narrowband wireless communications in accordance with various aspects of the present disclosure. The operations of method 1400 may be implemented by a device such as a UE 115 or its components as described with reference to FIGS. 1 and 2. For example, the operations of method 1400 may be performed by the UE DL power adjustment manager as described herein. In some examples, the UE 115 may execute a set of codes to control the functional elements of the device to perform the functions described below. Additionally or alternatively, the UE 115 may perform aspects the functions described below using special-purpose hardware.

At block 1405, the UE 115 may identify a first power ratio between a first EPRE and a NB-RS EPRE, wherein the first EPRE is for two or more OFDM symbols in which a CRS and a NB-RS are absent as described above with reference to FIGS. 2 through 5. In some examples, the first power ratio between the first EPRE and the NB-RS EPRE may be based on a number of antenna ports. In some examples, the UE 115 may receive a first power parameter in RRC signaling and determine the first power ratio based at least in part on the first power parameter. In certain examples, the operations of block 1405 may be performed by the power ratio component as described with reference to FIGS. 7 and 8. In some examples, the UE 115 may identify $\rho_{NA}$ as the ratio of N-PDSCH EPRE to NB-RS EPRE within OFDM symbols containing neither legacy CRS nor NB-RS. In some examples, a base station may signal a parameter associated with $\rho_{NA}$ to a UE, which may identify $\rho_{NA}$ based at least in part on the signaled parameter. In some examples, the signaled parameter may be the ratio $\rho_{NA}$. In other examples, the signaled parameter may be related to $\rho_{NA}$ through a defined relationship that may be configured at a UE.

At block 1410, the UE 115 may identify, based on the first power ratio, one from the group consisting of the first EPRE and the NB-RS EPRE as described above with reference to FIGS. 2 through 5. In certain examples, the UE 115 may identify, based on the first power ratio, the first EPRE. In certain examples, the operations of block 1410 may be performed by the EPRE identifying component as described with reference to FIGS. 7 and 8. In some examples, the UE 115 may determine N-PDSCH EPRE and NB-RS EPRE based on the identified $\rho_{NA}$ ratio. For example, the UE 115 may identify the N-PDSCH EPRE, and determine the NB-RS EPRE based on the identified $\rho_{NA}$ ratio. Similarly, the UE 115 may identify the NB-RS EPRE, and determine the N-PDSCH EPRE based on the identified $\rho_{NA}$ ratio. In some examples, UE 115 may determine a received power over an OFDM symbol and may determine NB-RS EPRE and N-PDSCH EPRE based on the identified $\rho_{NA}$ ratio.

At optional block 1415, the UE 115 may identify a second power ratio between a N-PDSCH EPRE and a CRS EPRE for ODFM symbols containing CRS as described above with reference to FIGS. 2 through 5. In examples where the UE 115 is operating in a guard-band deployment, the UE 115 may identify $\rho_B$ as ratio of N-PDSCH EPRE to CRS EPRE within OFDM symbols containing legacy CRS. In some examples, a base station 105 may identify $\rho_B$ based on a configured power for CRS and available power for the OFDM symbols containing CRS. The base station 105 may signal a parameter associated with $\rho_B$ to a UE 115, which may identify $\rho_B$ based at least in part on the signaled parameter.

In some examples, the UE 115 may identify a third power ratio between the NB-RS EPRE and the CRS EPRE. In some examples, the UE 115 may receive the third power ratio. In some examples, the UE 115 may determine the third power ratio based at least in part on a configured coverage enhancement level. In some examples, the UE 115 may determine a fourth power ratio between the NB-RS EPRE and a third EPRE for a resource element containing the downlink shared channel transmission within an OFDM symbol containing the NB-RS based at least in part on the first power ratio, the second power ratio, the third power ratio, or any combination thereof. In certain examples, the operations of block 1415 may be performed by the power ratio component as described with reference to FIGS. 7 and 8. In some examples, UE 115 may identify $\rho_C$ as ratio of NB-RS EPRE to CRS EPRE. The value of $\rho_C$ may be identified and signaled as discussed above with respect to FIG. 3. In some examples, the UE 115 operating in an in-band deployment may identify the fourth ratio of N-PDSCH EPRE to NB-RS EPRE within OFDM symbols containing NB-RS. In some examples, such an identification may be based on explicit signaling or an implicit determination (e.g., based on CE levels), as discussed above with respect to FIGS. 3 and 4.

At optional block 1420, the UE 115 may identify the CRS EPRE based at least in part on the one or more other power ratios as described above with reference to FIGS. 2 through 5. In certain examples, the operations of block 1420 may be performed by the EPRE identifying component as described with reference to FIGS. 7 and 8. In some examples, the UE 115 may determine N-PDSCH EPRE, CRS EPRE, and NB-RS EPRE based on $\rho_{NA}$, $\rho_B$, and $\rho_C$, as discussed above with respect to FIGS. 3 and 4.

At block 1425, the UE 115 may demodulate at least a portion of a downlink shared channel transmission received in the two or more OFDM symbols based on the identifying as described above with reference to FIGS. 2 through 5. In some examples, the UE 115 may demodulate at least a portion of a downlink shared channel transmission received in the two or more OFDM symbols based at least in part on the identifying of the first EPRE. In certain examples, the operations of block 1425 may be performed by the demodulation component as described with reference to FIGS. 7 and 8. In some examples, the UE that receives the signaling corresponding to one or more power adjustments, may use the relative powers of different REs to provide enhanced demodulation of received NB transmissions.

Figure 15:
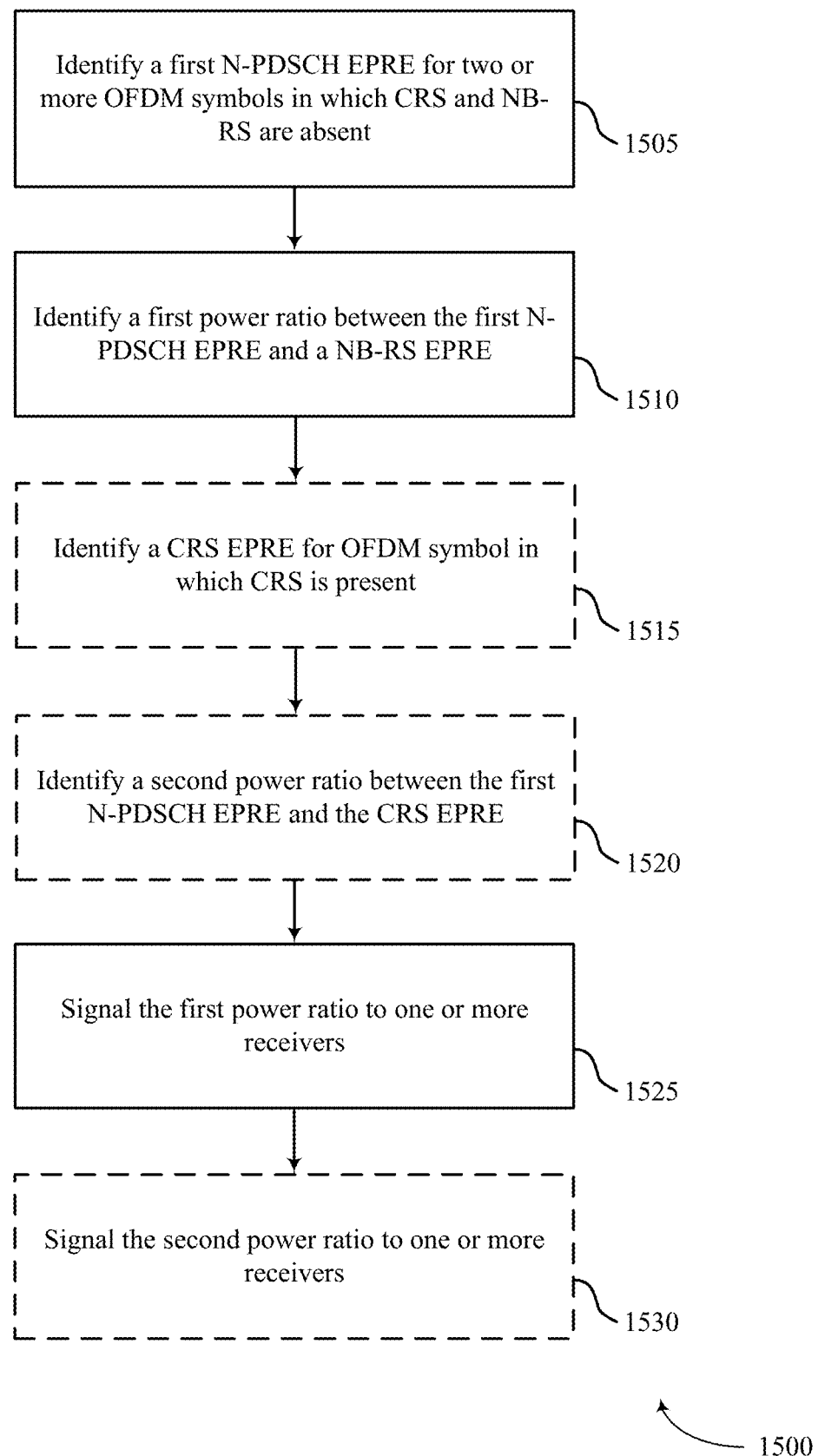

FIG. 15 shows a flowchart illustrating a method 1500 for downlink power adjustment in narrowband wireless communications in accordance with various aspects of the present disclosure. The operations of method 1500 may be implemented by a device such as a base station 105 or its components as described with reference to FIGS. 1 and 2. For example, the operations of method 1500 may be performed by the base station DL power adjustment manager as described herein. In some examples, the base station 105 may execute a set of codes to control the functional elements of the device to perform the functions described below. Additionally or alternatively, the base station 105 may perform aspects the functions described below using special-purpose hardware.

At block 1505, the base station 105 may identify a first downlink shared channel EPRE for two or more OFDM symbols in which a CRS and a NB-RS are absent as described above with reference to FIGS. 2 through 5. In certain examples, the operations of block 1505 may be performed by the EPRE component as described with reference to FIGS. 11 and 12.

At block 1510, the base station 105 may identify a first power ratio between the first downlink shared channel EPRE and a NB-RS EPRE as described above with reference to FIGS. 2 through 5. In some examples, the base station 105 may identify the first power ratio based on a number of antenna ports for an NB DL transmission. In some examples, the base station 105 may include a first parameter associated with the first power ratio in RRC signaling transmitted to the one or more receivers. In certain examples, the operations of block 1510 may be performed by the power ratio component as described with reference to FIGS. 11 and 12. In some examples, the base station 105 may identify $\rho_{NA}$ based on a configured power for NB-RS and available power for the OFDM symbols containing neither legacy CRS nor NB-RS. The base station may signal a parameter associated with $\rho_{NA}$ to a UE, which may identify $\rho_{NA}$ based at least in part on the signaled parameter. In some examples, the signaled parameter may be the ratio $\rho_{NA}$. In other examples, the signaled parameter may be related to $\rho_{NA}$ through a defined relationship that may be configured at a UE.

At optional block 1515, the base station 105 may identify a CRS EPRE for OFDM symbol in which CRS is present as described above with reference to FIGS. 2 through 5. In certain examples, the operations of block 1515 may be performed by the EPRE component as described with reference to FIGS. 11 and 12.

At optional block 1520, the base station 105 may identify a second power ratio between the first N-PDSCH EPRE and the CRS EPRE as described above with reference to FIGS. 2 through 5. In examples the base station 105 may identify $\rho_B$ based on a configured power for CRS and available power for the OFDM symbols containing CRS. The base station 105 may signal a parameter associated with $\rho_B$ to a UE 115, which may identify $\rho_B$ based at least in part on the signaled parameter.

In some examples, the base station 105 may identify a third power ratio between the NB-RS EPRE and the CRS EPRE. In some examples, the base station 105 may signal the third power ratio to the one or more receivers. In some examples, the base station 105 may signal the third power ratio to UE 115. In some examples, the base station 105 may determine a fourth power ratio between the NB-RS EPRE and a third EPRE for a resource element containing the downlink shared channel transmission within an OFDM symbol containing the NB-RS based at least in part on the first power ratio, the second power ratio, the third power ratio, or any combination thereof. In certain examples, the operations of block 1520 may be performed by the power ratio component as described with reference to FIGS. 11 and 12.

At block 1525, the base station 105 may signal the first power ratio to one or more receivers as described above with reference to FIGS. 2 through 5. In some examples, the base station 105 may include a second parameter associated with the second power ratio in a SIB transmitted to the one or more receivers. In certain examples, the operations of block 1525 may be performed by the power ratio signaling component as described with reference to FIGS. 11 and 12. In some examples, the base station may provide the second parameter, $P_B$, that may be a cell-specific parameter that may be signaled by the base station in a SIB. The value of $\rho_B$ may, in some examples, be equal to $\rho_A P_B$, where $P_B$ is determined based on the number of antenna ports.

At optional block 1530, the base station 105 may signal the second power ratio to one or more receivers as described above with reference to FIGS. 2 through 5. In certain examples, the operations of block 1525 may be performed by the power ratio signaling component as described with reference to FIGS. 11 and 12.

It should be noted that these methods describe possible implementation, and that the operations and the steps may be rearranged or otherwise modified such that other implementations are possible. In some examples, aspects from two or more of the methods may be combined. For example, aspects of each of the methods may include steps or aspects of the other methods, or other steps or techniques described herein. Thus, aspects of the disclosure may provide for downlink power adjustment in narrowband wireless communications.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not to be limited to the examples and designs described herein but is to be accorded the broadest scope consistent with the principles and novel features disclosed herein.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates an inclusive list such that, for example, a phrase referring to "at least one of" a list of items refers to any combination of those items, including single members. As an example, "at least one of: A, B, or C" is intended to cover A, B, C, A-B, A-C, B-C, and A-B-C, as well as any combination with multiples of the same element (e.g., A-A, A-A-A, A-A-B, A-A-C, A-B-B, A-C-C, B-B, B-B-B, B-B-C, C-C, and C-C-C or any other ordering of A, B, and C). As used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

Techniques described herein may be used for various wireless communications systems such as CDMA, TDMA, FDMA, OFDMA, single carrier frequency division multiple access (SC-FDMA), and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as (Global System for Mobile communications (GSM)). An OFDMA system may implement a radio technology such as Ultra Mobile Broadband (UMB), Evolved UTRA (E-UTRA), IEEE 802.11, IEEE 802.16 (WiMAX), IEEE 802.20, Flash-OFDM, etc. UTRA and E-UTRA are part of Universal Mobile Telecommunications system (UMTS). 3GPP LTE and LTE-advanced (LTE-A) are new releases of UMTS that use E-UTRA. UTRA, E-UTRA, UMTS, LTE, LTE-a, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description herein, however, describes an LTE system for purposes of example, and LTE terminology is used in much of the description above, although the techniques are applicable beyond LTE applications.

In LTE/LTE-A networks, including networks described herein, the term eNB may be generally used to describe the base stations. The wireless communications system or systems described herein may include a heterogeneous LTE/LTE-A network in which different types of eNBs provide coverage for various geographical regions. For example, each eNB or base station may provide communication coverage for a macro cell, a small cell, or other types of cell. The term "cell" can be used to describe a base station, a carrier or component carrier (CC) associated with a base station, or a coverage area (e.g., sector, etc.) of a carrier or base station, depending on context.

Base stations may include or may be referred to by those skilled in the art as a base transceiver station, a radio base station, an access point (AP), a radio transceiver, a NodeB, eNodeB (eNB), Home NodeB, a Home eNodeB, or some other suitable terminology. The geographic coverage area for a base station may be divided into sectors making up a portion of the coverage area. The wireless communications system or systems described herein may include base stations of different types (e.g., macro or small cell base stations). The UEs described herein may be able to communicate with various types of base stations and network equipment including macro eNBs, small cell eNBs, relay base stations, and the like. There may be overlapping geographic coverage areas for different technologies. In some cases, different coverage areas may be associated with different communication technologies. In some cases, the coverage area for one communication technology may overlap with the coverage area associated with another technology. Different technologies may be associated with the same base station, or with different base stations.

A macro cell generally covers a relatively large geographic area (e.g., several kilometers in radius) and may allow unrestricted access by UEs with service subscriptions with the network provider. A small cell is a lower-powered base stations, as compared with a macro cell, that may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs with service subscriptions with the network provider. A femto cell may also cover a small geographic area (e.g., a home) and may provide restricted access by UEs having an association with the femto cell (e.g., UEs in a closed subscriber group (CSG), UEs for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells (e.g., CCs). A UE may be able to communicate with various types of base stations and network equipment including macro eNBs, small cell eNBs, relay base stations, and the like.

The wireless communications system or systems described herein may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time. The techniques described herein may be used for either synchronous or asynchronous operations.

The DL transmissions described herein may also be called forward link transmissions while the UL transmissions may also be called reverse link transmissions. Each communication link described herein including, for example, wireless communications system 100 and 200 of FIGS. 1 and 2 may include one or more carriers, where each carrier may be a signal made up of multiple sub-carriers (e.g., waveform signals of different frequencies). Each modulated signal may be sent on a different sub-carrier and may carry control information (e.g., reference signals, control channels, etc.), overhead information, user data, etc. The communication links described herein (e.g., communication links 125 of FIG. 1) may transmit bidirectional communications using frequency division duplex (FDD) (e.g., using paired spectrum resources) or TDD operation (e.g., using unpaired spectrum resources). Frame structures may be defined for FDD (e.g., frame structure type 1) and TDD (e.g., frame structure type 2).

Thus, aspects of the disclosure may provide for downlink power adjustment in narrowband wireless communications. It should be noted that these methods describe possible implementations, and that the operations and the steps may be rearranged or otherwise modified such that other implementations are possible. In some examples, aspects from two or more of the methods may be combined.

The various illustrative blocks and modules described in connection with the disclosure herein may be implemented or performed with a general-purpose processor, a digital signal processor (DSP), an ASIC, an field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration). Thus, the functions described herein may be performed by one or more other processing units (or cores), on at least one integrated circuit (IC). In various examples, different types of ICs may be used (e.g., Structured/Platform ASICs, an FPGA, or another semi-custom IC), which may be programmed in any manner known in the art. The functions of each unit may also be implemented, in whole or in part, with instructions embodied in a memory, formatted to be executed by one or more general or application-specific processors.

What is claimed is:

1. A method for wireless communication at a wireless device, comprising:
   identifying, at the wireless device, a number of antenna ports used for a narrowband transmission over a narrowband downlink shared channel;
   identifying, at the wireless device, a first ratio between an energy per resource element (EPRE) of downlink shared channel resources of the narrowband downlink shared channel and an EPRE of a narrowband reference signal (NB-RS) based at least in part on the number of antenna ports;
   identifying that the narrowband downlink shared channel is configured according to an in-band deployment within a wideband downlink shared channel;
   identifying, at the wireless device, a second ratio between the EPRE of the NB-RS and an EPRE of a cell specific reference signal (CRS) of the wideband downlink shared channel based at least in part on identifying that the narrowband downlink shared channel is configured according to the in-band deployment; and
   demodulating, at the wireless device, the downlink shared channel resources based at least in part on the first ratio and the second ratio, wherein the narrowband downlink shared channel comprises the NB-RS and the CRS of the wideband downlink shared channel.

2. The method of claim 1, wherein identifying the first ratio further comprises:
   identifying a first value of the first ratio where the number of antenna ports is one; or
   identifying a second value of the first ratio where the number of antenna ports is two.

3. The method of claim 1, further comprising:
   identifying a third ratio between the EPRE of the CRS and a second EPRE for a resource element containing the narrowband transmission within an orthogonal frequency division multiplexing (OFDM) symbol containing the CRS; and
   identifying, based at least in part on the third ratio, one of either the EPRE of the CRS and the second EPRE.

4. The method of claim 1, wherein identifying the second ratio comprises:
   receiving the second ratio.

5. The method of claim 3, further comprising:
   determining a fourth ratio between the EPRE of the NB-RS and a third EPRE for a resource element containing the narrowband transmission within an OFDM symbol containing the NB-RS based at least in part on the first ratio, the second ratio, the third ratio, or any combination thereof.

6. The method of claim 5, wherein demodulating at least the portion of the narrowband transmission comprises:
   performing a channel estimation based at least in part on the EPRE of the CRS, the EPRE of the NB-RS, the EPRE of the downlink shared channel resources, the second EPRE, the third EPRE, or any combination thereof; and
   calculating a log likelihood ratio (LLR) associated with one or more received resource elements based at least in part on the EPRE of the CRS, the EPRE of the NB-RS, the EPRE of the downlink shared channel resources, the second EPRE, the third EPRE, or any combination thereof.

7. The method of claim 3, wherein identifying the third ratio comprises:
   receiving a parameter in a system information block (SIB); and
   determining the third ratio based at least in part on the parameter and the first ratio.

8. The method of claim 1, wherein identifying the first ratio comprises:
   receiving a parameter in radio resource control (RRC) signaling; and
   determining the first ratio based at least in part on the parameter.

9. The method of claim 8, further comprising:
   determining the first ratio based at least in part on the parameter and the number of antenna ports.

10. The method of claim 1, wherein identifying the second ratio comprises:
    determining the second ratio based at least in part on a configured coverage enhancement level.

11. The method of claim 1, further comprising:
    identifying a default value for the second ratio based at least in part on not receiving the second ratio.

12. A method for wireless communication at a wireless device, comprising:
    identifying, at the wireless device, a number of antenna ports to be used for a narrowband transmission over a narrowband downlink shared channel;
    identifying, at the wireless device, a first ratio between an energy per resource element (EPRE) of downlink shared channel resources of the narrowband downlink shared channel and an EPRE of a narrowband reference signal (NB-RS) based at least in part on the number of antenna ports;
    identifying that the narrowband downlink shared channel is configured according to an in-band deployment within a wideband downlink shared channel;
    identifying, at the wireless device, a second ratio between the EPRE of the NB-RS and an EPRE of a cell specific reference signal (CRS) of the wideband downlink shared channel based at least in part on identifying that the narrowband downlink shared channel is configured according to the in-band deployment;
    signaling, at the wireless device, the second ratio to one or more receivers; and
    transmitting, at the wireless device, the narrowband transmission to the one or more receivers according to the identified EPRE of the downlink shared channel resources and the second ratio, wherein the narrowband downlink shared channel comprises the NB-RS and the CRS of the wideband downlink shared channel.

13. The method of claim 12, further comprising:
identifying a third ratio between the EPRE of the CRS and a second EPRE for a resource element of the narrowband transmission within an orthogonal frequency division multiplexing (OFDM) symbol containing the CRS; and
signaling the third ratio to the one or more receivers,
wherein the transmitting the narrowband transmission to the one or more receivers comprises transmitting the CRS and the resource element according to the third ratio.

14. The method of claim 13, wherein signaling the third ratio comprises:
including a parameter associated with the third ratio in a system information block (SIB) transmitted to the one or more receivers.

15. The method of claim 13, further comprising:
determining a fourth ratio between the EPRE of the NB-RS and a third EPRE for a resource element of the narrowband transmission within an OFDM symbol containing the NB-RS based at least in part on the first ratio.

16. The method of claim 12, wherein signaling the first ratio comprises:
including a parameter associated with the first ratio in radio resource control (RRC) signaling transmitted to the one or more receivers.

17. An apparatus for wireless communication, comprising:
a processor; and
memory in electronic communication with the processor, wherein the processor and memory are configured to cause the apparatus to:
identify a number of antenna ports used for a narrowband transmission over a narrowband downlink shared channel;
identify a first ratio between an energy per resource element (EPRE) of downlink shared channel resources of the narrowband downlink shared channel and an EPRE of a narrowband reference signal (NB-RS) based at least in part on the number of antenna ports;
identify that the narrowband downlink shared channel is configured according to an in-band deployment within a wideband downlink shared channel;
identify a second ratio between the EPRE of the NB-RS and an EPRE of a cell specific reference signal (CRS) of the wideband downlink shared channel based at least in part on identifying that the narrowband downlink shared channel is configured according to the in-band deployment; and
demodulate the downlink shared channel resources based at least in part on the first ratio and the second ratio, wherein the narrowband downlink shared channel comprises the NB-RS and the CRS of the wideband downlink shared channel.

18. The apparatus of claim 17, wherein the processor and memory are configured to cause the apparatus to:
identify a first value of the first ratio where the number of antenna ports is one; and
identify a second value of the first ratio where the number of antenna ports is two.

19. The apparatus of claim 17, wherein the processor and memory are configured to cause the apparatus to:
identify a third ratio between the EPRE of the CRS and a second EPRE for a resource element containing the narrowband transmission within an orthogonal frequency division multiplexing (OFDM) symbol containing the CRS;
identify, based at least in part on the third ratio, one of either the EPRE of the CRS and the second EPRE.

20. The apparatus of claim 19, wherein the processor and memory are configured to cause the apparatus to:
receive the second ratio.

21. The apparatus of claim 19, wherein the processor and memory are configured to cause the apparatus to:
determine a fourth ratio between the EPRE of the NB-RS and a third EPRE for a resource element containing the narrowband transmission within an orthogonal frequency division multiplexing (OFDM) symbol containing the NB-RS based at least in part on the first ratio, the second ratio, the third ratio, or any combination thereof.

22. The apparatus of claim 21, wherein the processor and memory are configured to cause the apparatus to:
perform a channel estimation based at least in part on the EPRE of the CRS, the EPRE of the NB-RS, the EPRE of the downlink shared channel resources, the second EPRE, the third EPRE, or any combination thereof; and
calculate a log likelihood ratio (LLR) associated with one or more received resource elements based at least in part on the EPRE of the CRS, the EPRE of the NB-RS, the EPRE of the downlink shared channel resources, the second EPRE, the third EPRE, or any combination thereof.

23. The apparatus of claim 19, wherein the processor and memory are configured to cause the apparatus to:
receive a parameter in a system information block (SIB); and
determine the third ratio based at least in part on the parameter and the first ratio.

24. The apparatus of claim 17, wherein the processor and memory are configured to cause the apparatus to:
receive a parameter in radio resource control (RRC) signaling; and
determine the first ratio based at least in part on the parameter.

25. The apparatus of claim 24, wherein the processor and memory are configured to cause the apparatus to:
determine the first ratio based at least in part on the parameter and the number of antenna ports.

26. The apparatus of claim 17, wherein the processor and memory are configured to cause the apparatus to:
determine the second ratio based at least in part on a configured coverage enhancement level.

27. The apparatus of claim 17, wherein the processor and memory are configured to cause the apparatus to:
identify a default value for the second ratio based at least in part on not receiving the second ratio.

28. An apparatus for wireless communication, comprising:
a processor; and
memory in electronic communication with the processor, wherein the processor and memory configured to cause the apparatus to:
identify a number of antenna ports to be used for a narrowband transmission over a narrowband downlink shared channel;
identify a first ratio between an energy per resource element (EPRE) of downlink shared channel resources of the narrowband downlink shared channel and an EPRE of a narrowband reference signal (NB-RS) based at least in part on the number of antenna ports;

identify that the narrowband downlink shared channel is configured according to an in-band deployment within a wideband downlink shared channel;

identify a second ratio between the EPRE of the NB-RS and an EPRE of a cell specific reference signal (CRS) of the wideband downlink shared channel based at least in part on identifying that the narrowband downlink shared channel is configured according to the in-band deployment;

signal the second ratio to one or more receivers; and transmit the narrowband transmission to the one or more receivers according to the identified EPRE of the first downlink shared channel resources and the second ratio, wherein the narrowband downlink shared channel comprises the NB-RS and the CRS of the wideband downlink shared channel.

29. The apparatus of claim 28, wherein the processor and memory are configured to cause the apparatus to:

identify a third ratio between the EPRE of the CRS and a second EPRE for a resource element of the narrowband transmission within an orthogonal frequency division multiplexing (OFDM) symbol containing the CRS; and signal the third ratio to the one or more receivers;

wherein the processor and memory are further configured to cause the apparatus to transmit the CRS and the resource element according to the third ratio.

30. The apparatus of claim 29, wherein the processor and memory are configured to cause the apparatus to:

include a second parameter associated with the third ratio in a system information block (SIB) transmitted to the one or more receivers.

31. An apparatus for wireless communication, comprising:

means for identifying a number of antenna ports used for a narrowband transmission over a narrowband downlink shared channel;

means for identifying a first ratio between an energy per resource element (EPRE) of downlink shared channel resources of the narrowband downlink shared channel and an EPRE of a narrowband reference signal (NB-RS) based at least in part on the number of antenna ports;

means for identifying that the narrowband downlink shared channel is configured according to an in-band deployment within a wideband downlink shared channel;

means for identifying a second ratio between the EPRE of the NB-RS and an EPRE of a cell specific reference signal (CRS) of the wideband downlink shared channel based at least in part on identifying that the narrowband downlink shared channel is configured according to the in-band deployment; and means for demodulating the downlink shared channel resources based at least in part on the first ratio and the second ratio, wherein the narrowband downlink shared channel comprises the NB-RS and the CRS of the wideband downlink shared channel.

32. The apparatus of claim 31, wherein the means for identifying the first ratio:

identifies a first value of the first ratio where the number of antenna ports is one; or identifies a second value of the first ratio where the number of antenna ports is two.

33. The apparatus of claim 31, further comprising:

means for identifying a third ratio between the EPRE of the CRS and a second EPRE for a resource element containing the narrowband transmission within an orthogonal frequency division multiplexing (OFDM) symbol containing the CRS; and means for identifying, based at least in part on the third ratio, one of either the EPRE of the CRS and the second EPRE.

34. The apparatus of claim 31, wherein the means for identifying the second ratio:

means for receiving the second ratio.

35. The apparatus of claim 33, further comprising:

means for determining a fourth ratio between the EPRE of the NB-RS and a third EPRE for a resource element containing the narrowband transmission within an OFDM symbol containing the NB-RS based at least in part on the first ratio, the second ratio, the third ratio, or any combination thereof.

36. The apparatus of claim 35, wherein the means for demodulating at least the portion of the narrowband transmission comprises:

means for performing a channel estimation based at least in part on the EPRE of the CRS, the EPRE of the NB-RS, the EPRE of the downlink shared channel resources, the second EPRE, the third EPRE, or any combination thereof; and means for calculating a log likelihood ratio (LLR) associated with one or more received resource elements based at least in part on the EPRE of the CRS, the EPRE of the NB-RS, the EPRE of the downlink shared channel resources, the second EPRE, the third EPRE, or any combination thereof.

37. The apparatus of claim 33, wherein the means for identifying the third ratio comprises:

means for receiving a parameter in a system information block (SIB); and means for determining the third ratio based at least in part on the parameter and the first ratio.

38. The apparatus of claim 31, wherein the means for identifying the first ratio comprises:

means for receiving a parameter in radio resource control (RRC) signaling; and means for determining the first ratio based at least in part on the parameter.

39. The apparatus of claim 38, further comprising:

determining the first ratio based at least in part on the parameter and the number of antenna ports.

40. The apparatus of claim 31, wherein the wherein the means for identifying the second ratio:

means for determining the second ratio based at least in part on a configured coverage enhancement level.

41. The apparatus of claim 31, wherein the means for identifying the second ratio identifies a default value for the second ratio based at least in part on not receiving the second ratio.

42. An apparatus for wireless communication, comprising:

means for identifying a number of antenna ports to be used for a narrowband transmission over a narrowband downlink shared channel;

means for identifying a first ratio between an energy per resource element (EPRE) of downlink shared channel resources of the narrowband downlink shared channel and an EPRE of a narrowband reference signal (NB-RS) based at least in part on the number of antenna ports;

means for identifying that the narrowband downlink shared channel is configured according to an in-band deployment within a wideband downlink shared channel;

means for identifying a second ratio between the EPRE of the NB-RS and an EPRE of a cell specific reference signal (CRS) of the wideband downlink shared channel based at least in part on identifying that the narrowband downlink shared channel is configured according to the in-band deployment;

means for signaling the second ratio to one or more receivers; and means for transmitting the narrowband transmission to the one or more receivers according to the identified EPRE of the downlink shared channel resources and the second ratio, wherein the narrowband downlink shared channel comprises the NB-RS and the CRS of the wideband downlink shared channel.

43. The apparatus of claim 42, further comprising:

means for identifying a third ratio between the EPRE of the CRS and a second EPRE for a resource element of the narrowband transmission within an orthogonal frequency division multiplexing (OFDM) symbol containing the CRS; and means for signaling the third ratio to the one or more receivers, wherein the means for transmitting the narrowband transmission to the one or more receivers transmits the CRS and the resource element according to the third ratio.

44. The apparatus of claim 43, wherein the means for signaling the third ratio includes a parameter associated with the third ratio in a system information block (SIB) transmitted to the one or more receivers.

45. The apparatus of claim 43, further comprising:

means for determining a fourth ratio between the EPRE of the NB-RS and a third EPRE for a resource element of the narrowband transmission within an OFDM symbol containing the NB-RS based at least in part on the first ratio.

46. The apparatus of claim 42, wherein the means for signaling the first ratio includes a parameter associated with the first ratio in radio resource control (RRC) signaling transmitted to the one or more receivers.

47. A non-transitory computer-readable medium storing code for wireless communication implemented by a wireless device, the code comprising instructions executable by a processor to:

identify, at the wireless device, a number of antenna ports used for a narrowband transmission over a narrowband downlink shared channel;

identify, at the wireless device, a first ratio between an energy per resource element (EPRE) of downlink shared channel resources of the narrowband downlink shared channel and an EPRE of a narrowband reference signal (NB-RS) based at least in part on the number of antenna ports;

identify that the narrowband downlink shared channel is configured according to an in-band deployment within a wideband downlink shared channel;

identify, at the wireless device, a second ratio between the EPRE of the NB-RS and an EPRE of a cell specific reference signal (CRS) of the wideband downlink shared channel based at least in part on identifying that the narrowband downlink shared channel is configured according to the in-band deployment; and demodulate, at the wireless device, the downlink shared channel resources based at least in part on the first ratio and the second ratio, wherein the narrowband downlink shared channel comprises the NB-RS and the CRS of the wideband downlink shared channel.

48. The non-transitory computer-readable medium of claim 47, wherein the instructions executable by the processor to identify the first ratio further comprise instructions executable by the processor to:

identify a first value of the first ratio where the number of antenna ports is one; or identify a second value of the first ratio where the number of antenna ports is two.

49. The non-transitory computer-readable medium of claim 47, wherein the instructions are further executable by the processor to:

identify a third ratio between the EPRE of the CRS and a second EPRE for a resource element containing the narrowband transmission within an orthogonal frequency division multiplexing (OFDM) symbol containing the CRS; and identify, based at least in part on the third ratio, one of either the EPRE of the CRS and the second EPRE.

50. The non-transitory computer-readable medium of claim 47, wherein the instructions executable by the processor to identify the second ratio comprise instructions executable by the processor to:

receive the second ratio.

51. The non-transitory computer-readable medium of claim 49, wherein the instructions are further executable by the processor to:

determine a fourth ratio between the EPRE of the NB-RS and a third EPRE for a resource element containing the narrowband transmission within an OFDM symbol containing the NB-RS based at least in part on the first ratio, the second ratio, the third ratio, or any combination thereof.

52. The non-transitory computer-readable medium of claim 51, wherein the instructions executable by the processor to demodulate at least the portion of the narrowband transmission comprise instructions executable by the processor to:

perform a channel estimation based at least in part on the EPRE of the CRS, the EPRE of the NB-RS, the EPRE of the downlink shared channel resources, the second EPRE, the third EPRE, or any combination thereof; and calculate a log likelihood ratio (LLR) associated with one or more received resource elements based at least in part on the EPRE of the CRS, the EPRE of the NB-RS, the EPRE of the downlink shared channel resources, the second EPRE, the third EPRE, or any combination thereof.

53. The non-transitory computer-readable medium of claim 49, wherein the instructions executable by the processor to identify the third ratio comprise instructions executable by the processor to:

receive a parameter in a system information block (SIB); and determine the third ratio based at least in part on the parameter and the first ratio.

54. The non-transitory computer-readable medium of claim 47, wherein the instructions executable by the processor to identify the first ratio comprise instructions executable by the processor to:

receive a parameter in radio resource control (RRC) signaling; and determine the first ratio based at least in part on the parameter.

55. The non-transitory computer-readable medium of claim 54, wherein the instructions are further executable by the processor to:

determine the first ratio based at least in part on the parameter and the number of antenna ports.

56. The non-transitory computer-readable medium of claim 47, wherein the wherein the instructions executable by the processor to identify the second ratio comprise instructions executable by the processor to:
determine the second ratio based at least in part on a configured coverage enhancement level.

57. The non-transitory computer-readable medium of claim 47, wherein the instructions executable by the processor to identify the second ratio comprise instructions executable by the processor to:
identify a default value for the second ratio based at least in part on not receiving the second ratio.

58. A non-transitory computer-readable medium storing code for wireless communication implemented by a wireless device, the code comprising instructions executable by a processor to:
identify, at the wireless device, a number of antenna ports to be used for a narrowband transmission over a narrowband downlink shared channel;
identify, at the wireless device, a first ratio between an energy per resource element (EPRE) of downlink shared channel resources of the narrowband downlink shared channel and an EPRE of a narrowband reference signal (NB-RS) based at least in part on the number of antenna ports;
identify that the narrowband downlink shared channel is configured according to an in-band deployment within a wideband downlink shared channel;
identify, at the wireless device, a second ratio between the EPRE of the NB-RS and an EPRE of a cell specific reference signal (CRS) of the wideband downlink shared channel based at least in part on identifying that the narrowband downlink shared channel is configured according to the in-band deployment;
signal, at the wireless device, the second ratio to one or more receivers; and
transmit, at the wireless device, the narrowband transmission to the one or more receivers according to the identified EPRE of the downlink shared channel resources and the second ratio, wherein the narrowband downlink shared channel comprises the NB-RS and the CRS of the wideband downlink shared channel.

59. The non-transitory computer-readable medium of claim 58, wherein the instructions are further executable by the processor to:
identify a third ratio between the EPRE of the CRS and a second EPRE for a resource element of the narrowband transmission within an orthogonal frequency division multiplexing (OFDM) symbol containing the CRS; and
signal the third ratio to the one or more receivers,
wherein the transmitting the narrowband transmission to the one or more receivers comprises transmitting the CRS and the resource element according to the third ratio.

60. The non-transitory computer-readable medium of claim 59, wherein the instructions executable by the processor to signal the third ratio comprise instructions executable by the processor to:
include a parameter associated with the third ratio in a system information block (SIB) transmitted to the one or more receivers.

61. The non-transitory computer-readable medium of claim 59, wherein the instructions are further executable by the processor to:
determine a fourth ratio between the EPRE of the NB-RS and a third EPRE for a resource element of the narrowband transmission within an OFDM symbol containing the NB-RS based at least in part on the first ratio.

62. The non-transitory computer-readable medium of claim 58, wherein the instructions executable by the processor to signal the first ratio comprise instructions executable by the processor to:
include a parameter associated with the first ratio in radio resource control (RRC) signaling transmitted to the one or more receivers.

* * * * *